(12) United States Patent
Wang et al.

(10) Patent No.: US 9,729,560 B2
(45) Date of Patent: Aug. 8, 2017

(54) METHOD AND DEVICE FOR SYNCHRONIZING NETWORK DATA FLOW DETECTION STATUS

(71) Applicant: Huawei Technologies Co., Ltd., Shenzhen (CN)

(72) Inventors: Yuchen Wang, Beijing (CN); Dacheng Zhang, Beijing (CN); Jian Meng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/482,210

(22) Filed: Sep. 10, 2014

(65) Prior Publication Data

US 2014/0380415 A1    Dec. 25, 2014

Related U.S. Application Data

(63) Continuation of application No. PCT/CN2012/082882, filed on Oct. 12, 2012.

(51) Int. Cl.
*G06F 17/00* (2006.01)
*H04L 29/06* (2006.01)
(Continued)

(52) U.S. Cl.
CPC ...... *H04L 63/1416* (2013.01); *G06F 9/45558* (2013.01); *H04L 43/026* (2013.01);
(Continued)

(58) Field of Classification Search
CPC .......................... H04L 63/1416; G06F 9/45558
See application file for complete search history.

(56) References Cited

U.S. PATENT DOCUMENTS

2003/0120816 A1  6/2003 Berthaud et al.
2009/0249438 A1* 10/2009 Litvin ................. H04L 63/0263
                                                        726/1
2011/0277034 A1* 11/2011 Hanson ............... H04L 63/1433
                                                        726/25

FOREIGN PATENT DOCUMENTS

CN           1725702 A      1/2006
CN         101572691 A     11/2009
(Continued)

OTHER PUBLICATIONS

Foreign Communication From a Counterpart Application, European Application No. 12886376.8, Extended European Search Report dated Jan. 23, 2015, 7 pages.

(Continued)

*Primary Examiner* — Kambiz Zand
*Assistant Examiner* — Suman Debnath
(74) *Attorney, Agent, or Firm* — Conley Rose, P.C.

(57) ABSTRACT

A method and a device for synchronizing network data flow detection status are provided. The method includes: a status synchronizing server receives a first request sent by a first security device node, where the first request carries a first flow entry of a first data flow that is currently detected by the first security device node; determines first network data flow detection status corresponding to the first flow entry; sends a first response to the first security device node, where the first response carries the first network data flow detection status. A security device node requests previous network data flow detection status of a data flow from a status synchronizing server so as to synchronize network data flow detection status, thereby allowing the security device node to detect a network attack in a more accurate way and improving network system security.

19 Claims, 13 Drawing Sheets

(51) Int. Cl.
*H04L 12/26* (2006.01)
*G06F 9/455* (2006.01)

(52) U.S. Cl.
CPC .............. *H04L 43/04* (2013.01); *H04L 63/20*
(2013.01); *G06F 2009/45595* (2013.01); *H04L 63/08* (2013.01)

(56) References Cited

FOREIGN PATENT DOCUMENTS

| | | | |
|---|---|---|---|
| CN | 101605132 | A | 12/2009 |
| CN | 101616034 | A | 12/2009 |
| CN | 102025535 | A | 4/2011 |
| CN | 102684944 | A | 9/2012 |
| WO | 20130159518 | A1 | 10/2013 |

OTHER PUBLICATIONS

Partial English Translation and Abstract of Chinese Patent Application No. CN102684944A, Sep. 16, 2014, 4 pages.
Foreign Communication From a Counterpart Application, PCT Application No. PCT/CN2012/082882, English Translation of International Search Report dated Jul. 25, 2013, 2 pages.
Foreign Communication From a Counterpart Application, PCT Application No. PCT/CN2012/082882, Written Opinion dated Jul. 25, 2013, 10 pages.
Foreign Communication From a Counterpart Application, Chinese Application No. 201280021599.6, Chinese Office Action dated May 20, 2016, 13 pages.
Foreign Communication From a Counterpart Application, Chinese Application No. 201280021599.6, Chinese Search Report dated May 11, 2016, 7 pages.

* cited by examiner

METHOD AND DEVICE FOR SYNCHRONIZING NETWORK DATA FLOW DETECTION STATUS

CROSS-REFERENCE TO RELATED APPLICATION

This application is a continuation of International Application No. PCT/CN2012/082882, filed on Oct. 12, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of network technologies, and in particular, to a method and a device for synchronizing network data flow detection status.

BACKGROUND

All current security detection systems, such as a firewall and an intrusion detection system (IDS) determine, by detecting network data, whether network traffic meets requirements of a security policy. For the firewall and the IDS, there are two methods for traffic detection. One is called a "stateless detection method". In this method, network characteristics of only a single data packet are detected. It is determined whether network traffic is valid according to network attributes (for example, quintuple information) in the data packet or characteristics (for example, content keywords in an application load of the data packet) obtained from deep packet inspection (DPI). In this method, only a single data packet needs to be detected. The detection method is independent of status of the network traffic or a context of the network traffic.

A typical application of the "stateless detection method" is an access control list (ACL) firewall. This firewall determines whether traffic is valid according to information, for example, "quintuple", in the single data packet.

In the other method, a security detection system needs to detect multiple data packets and determine, according to information included in a sequence (context) of the data packets, whether network traffic meets requirements of the security policy. This is called a "method for stateful detection of network traffic". In this method, a security device node needs to identify information that is included in a sequence formed by the multiple data packets, such as abnormal Transmission Control Protocol (TCP) connection status, content keywords of an attack characteristic that are intentionally scattered among the multiple data packets, and multiple specific data packets arriving in a specific order, so as to determine whether a communication data flow is valid. In the "method for stateful detection of network traffic", stateful detection needs to be performed for the multiple data packets, and a result of the detection is related to a context of network communication.

A specific security application of the "method for stateful detection of network traffic" includes a "stateful inspection firewall" and "network intrusion detection" systems most of which have fragment recombination and session recombination functions. What the firewall and the systems have in common is as follows: invalid traffic cannot be identified by detecting only a single data packet, multiple data packets must be detected, and characteristics included in the sequence formed by the multiple data packets are identified to determine whether a communication activity is valid.

A typical application of the "method for stateful detection of network traffic" is a stateful inspection firewall (SIF) or an IDS.

As security functions that the "stateless detection method" is capable of implementing are too simple, the method for stateful detection of network traffic is the most widely used method in network security.

A detection principle of the "method for stateful detection of network traffic" is as follows:

Rule Rule1 for detecting an attack may be represented by a sequence of a group of network detection events "A,B,C,D". For example, when a security device node SIF/IDS identifies from the sequence of data packets that events occur in an order of "A,B,C,D", it can be determined that attack event Attack1 that meets attack characteristics of Rule1 has occurred.

When a virtual machine (VM) acts as a communication entity, the security device node SIF/IDS is generally located on the same host as the virtual machine to detect data flows of the virtual machine. In this case, if a process where the virtual machine migrates occurs, a corresponding security device node SIF/IDS that is responsible for detecting traffic of the virtual machine before the migration cannot detect subsequent network traffic of the virtual machine, and a corresponding security device node SIF/IDS that is capable of detecting traffic of the virtual machine after the migration cannot know network detection events that have occurred before the migration. As a result, both of the two different security device nodes SIF/IDS before and after the migration cannot discover a network attack targeting the virtual machine, thereby deteriorating network system security.

SUMMARY

Embodiments of the present invention provide a method and a device for synchronizing network data flow detection status, which are capable of improving network system security.

According to one aspect, a method for synchronizing network data flow detection status is provided, including: receiving a first request sent by a first security device node, where the first request carries a first flow entry of a first data flow that is currently detected by the first security device node, and a flow entry is used to uniquely identify a data flow determining first network data flow detection status corresponding to the first flow entry; and sending a first response to the first security device node, where the first response carries the first network data flow detection status, so that the first security device node maintains, according to the first response, second network data flow detection status that corresponds to the first flow entry and is stored on the first security device node.

With reference to the first aspect, in an implementation manner, the determining first network data flow detection status corresponding to the first flow entry includes: querying a locally stored registration record of the first flow entry; and determining, according to a result of the query, the first network data flow detection status corresponding to the first flow entry, where a registration record of a flow entry includes the flow entry as well as a security device node and network data flow detection status that correspond to the flow entry.

With reference to the first aspect and the preceding implementation manner, in another implementation manner, the determining, according to a result of the query, the first network data flow detection status corresponding to the first flow entry includes, if no registration record of the first flow entry is found, locally adding a registration record of the first flow entry, setting network data flow detection status corresponding to the first flow entry in the registration record to NULL, and determining that the first network data flow detection status is NULL.

With reference to the first aspect and the preceding implementation manners, in another implementation manner, the determining, according to a result of the query, the first network data flow detection status corresponding to the first flow entry includes, if the registration record of the first flow entry is found, determining, according to information about a security device node corresponding to the first flow entry in the registration record, the first network data flow detection status corresponding to the first flow entry.

With reference to the first aspect and the preceding implementation manners, in another implementation manner, the determining, according to information about the security device node corresponding to the first flow entry in the registration record, the first network data flow detection status corresponding to the first flow entry includes, when the security device node corresponding to the first flow entry in the registration record is NULL, determining the network data flow detection status corresponding to the first flow entry in the registration record as the first network data flow detection status.

With reference to the first aspect and the preceding implementation manners, in another implementation manner, the determining, according to information about the security device node corresponding to the first flow entry, the first network data flow detection status corresponding to the first flow entry includes, when the security device node corresponding to the first flow entry in the registration record is a second security device node, sending a second request to the second security device node, where the second request carries the first flow entry, so as to request the second security device node to send third network data flow detection status that corresponds to the first flow entry and is recorded on the second security device node; when no response to the second request is received from the second security device node, determining the network data flow detection status corresponding to the first flow entry in the registration record as the first network data flow detection status; and when the third network data flow detection status sent by the second security device node is received, updating the network data flow detection status that corresponds to the first flow entry and is in the local registration record of the first flow entry to the third network data flow detection status, and determining the third network data flow detection status as the first network data flow detection status.

With reference to the first aspect and the preceding implementation manners, in another implementation manner, the method further includes recording a correspondence between the first flow entry and the first security device node.

With reference to the first aspect and the preceding implementation manners, in another implementation manner, before the receiving a first request sent by a first security device node, the method further includes: receiving a connection request sent by the first security device node; and authenticating an identity of the first security device node according to the connection request so as to configure a request permission of the first security device node.

With reference to the first aspect and the preceding implementation manners, in another implementation manner, the method further includes: receiving a status update request that is sent by a third security device node according to a preset triggering event or periodically, where the status update request carries a second flow entry of a second data flow that is currently detected by the third security device node and corresponding network data flow detection status; and maintaining, according to the status update request, locally stored registration record of flow entries.

With reference to the first aspect and the preceding implementation manners, in another implementation manner, the maintaining, according to the status update request, locally stored registration record of flow entries includes, when no registration record of the second flow entry is locally stored, adding a registration record of the second flow entry; when the registration record of the second flow entry is locally stored and a security device node corresponding to the second flow entry in the registration record is the third security device node, updating, by using the network data flow detection status that corresponds to the second flow entry and is carried in the status update request, network data flow detection status that is locally recorded and corresponds to the second flow entry; and when the registration record of the second flow entry is locally stored and the security device node corresponding to the second flow entry in the registration record is not the third security device node, ignoring the status update request.

With reference to the first aspect and the preceding implementation manners, in another implementation manner, the status update request further carries an event type, where the event type is used to indicate whether the status update request is sent according to a preset triggering event or periodically.

The maintaining, according to the status update request, locally stored registration record of flow entries further includes, if the event type indicates that the status update request is sent according to the preset triggering event, setting the security device node corresponding to the second flow entry in the registration record of the second flow entry to NULL; and if the event type indicates that the status update request is sent periodically, setting the security device node corresponding to the second flow entry in the registration record of the second flow entry to the third security device node.

With reference to the first aspect and the preceding implementation manners, in another implementation manner, the first flow entry includes an identifier of a virtual machine that generates the first data flow and a multi-tuple of the first data flow.

According to a second aspect, a method for synchronizing network data flow detection status is provided, including: sending a first request to a status synchronizing server, where the first request carries a first flow entry of a first data flow that is currently detected by a first security device node, and a flow entry is used to uniquely identify a data flow; receiving a first response that is sent by the status synchronizing server according to the first request, where the first response carries first network data flow detection status corresponding to the first flow entry; and maintaining, according to the first response, second network data flow detection status that corresponds to the first flow entry and is stored on the first security device node.

With reference to the second aspect, in an implementation manner, the method further includes: receiving a second request sent by the status synchronizing server, where the second request carries a third flow entry of a third data flow that is currently detected by a fourth security device node; acquiring third network data flow detection status that corresponds to the third flow entry and is recorded on the first security device node; and sending a second response to the status synchronizing server, where the second response carries the third network data flow detection status.

With reference to the second aspect and the preceding implementation manner, in another implementation manner, before the sending a first request to a status synchronizing server, the method further includes: sending a connection request to the status synchronizing server, so that the status synchronizing server authenticates an identity of the first security device node according to the connection request; and receiving information about a request permission of the first security device node, where the request permission is configured by the status synchronizing server after the identity authentication succeeds.

With reference to the second aspect and the preceding implementation manners, in another implementation manner, the method further includes sending a status update request to the status synchronizing server according to a preset triggering event or periodically, where the status update request carries a second flow entry of a second data flow that is currently detected by the first security device node and corresponding network data flow detection status, so that the status synchronizing server maintains, according to the status update request, a registration record of flow entries, where the registration record of the flow entries is stored on the status synchronizing server.

With reference to the second aspect and the preceding implementation manners, in another implementation manner, the status update request further carries an event type, where the event type is used to indicate whether the status update request is sent according to a preset triggering event or periodically.

With reference to the second aspect and the preceding implementation manners, in another implementation manner, the first flow entry includes an identifier of a virtual machine that generates the first data flow and a multi-tuple of the first data flow.

According to a third aspect, a status synchronizing server is provided, including: a receiving unit configured to receive a first request sent by a first security device node, where the first request carries a first flow entry of a first data flow that is currently detected by the first security device node, and a flow entry is used to uniquely identify a data flow; a determining unit configured to extract the first flow entry from the first request received by the receiving unit and determine first network data flow detection status corresponding to the first flow entry; and a sending unit configured to send a first response to the first security device node, where the first response carries the first network data flow detection status determined by the determining unit, so that the first security device node maintains, according to the first response, second network data flow detection status that corresponds to the first flow entry and is stored on the first security device node.

With reference to the third aspect, in an implementation manner, the determining unit is specifically configured to query a locally stored registration record of the first flow entry; and determine, according to a result of the query, the first network data flow detection status corresponding to the first flow entry, where a registration record of a flow entry includes the flow entry as well as a security device node and network data flow detection status that correspond to the flow entry.

With reference to the third aspect and the preceding implementation manner, in another implementation manner, if no registration record of the first flow entry is found, the determining unit is specifically configured to locally add a registration record of the first flow entry, set network data flow detection status corresponding to the first flow entry in the registration record to NULL, and determine that the first network data flow detection status is NULL; or if the registration record of the first flow entry is found, the determining unit is specifically configured to determine, according to information about the security device node corresponding to the first flow entry in the registration record, the first network data flow detection status corresponding to the first flow entry.

With reference to the third aspect and the preceding implementation manners, in another implementation manner, the determining unit is specifically configured to, when the security device node corresponding to the first flow entry in the registration record is NULL, determine the network data flow detection status corresponding to the first flow entry in the registration record as the first network data flow detection status; or when the security device node corresponding to the first flow entry in the registration record is a second security device node, send a second request to the second security device node, where the second request carries the first flow entry, so as to request the second security device node to send third network data flow detection status that corresponds to the first flow entry and is recorded on the second security device node; when no response to the second request is received from the second security device node, determine the network data flow detection status corresponding to the first flow entry in the registration record as the first network data flow detection status; and when the third network data flow detection status sent by the second security device node is received, update the network data flow detection status that corresponds to the first flow entry and is in the local registration record of the first flow entry to the third network data flow detection status, and determine the third network data flow detection status as the first network data flow detection status.

With reference to the third aspect and the preceding implementation manners, in another implementation manner, the receiving unit is further configured to receive a connection request sent by the first security device node; and the status synchronizing server further includes an authenticating unit that is configured to authenticate an identity of the first security device node according to the connection request, so as to configure a request permission of the first security device node.

With reference to the third aspect and the preceding implementation manners, in another implementation manner, the receiving unit is further configured to receive a status update request that is sent by a third security device node according to a preset triggering event or periodically, where the status update request carries a second flow entry of a second data flow that is currently detected by the third security device node and corresponding network data flow detection status; and the status synchronizing server further includes a maintaining unit configured to maintain, according to the status update request, a stored registration record of the flow entry.

With reference to the third aspect and the preceding implementation manners, in another implementation manner, the maintaining unit is specifically configured to, when no registration record of the second flow entry is locally stored, add a registration record of the second flow entry; when the registration record of the second flow entry is locally stored and a security device node corresponding to the second flow entry in the registration record is the third security device node, update, by using the network data flow detection status that corresponds to the second flow entry and is carried in the status update request, network data flow detection status that is locally recorded and corresponds to the second flow entry; and when the registration record of the second flow entry is locally stored and the security device node corresponding to the second flow entry in the registration record is not the third security device node, ignore the status update request.

With reference to the third aspect and the preceding implementation manners, in another implementation manner, the status update request received by the receiving unit further carries an event type, where the event type is used to indicate whether the status update request is sent according to a preset triggering event or periodically.

The maintaining unit is further configured to set the security device node corresponding to the second flow entry in the registration record of the second flow entry to NULL in a case where the event type indicates that the status update request is sent according to the preset triggering event; and set the security device node corresponding to the second flow entry in the registration record of the second flow entry to the third security device node in a case where the event type indicates that the status update request is sent periodically.

With reference to the third aspect and the preceding implementation manners, in another implementation manner, the first flow entry that is carried in the first request received by the receiving unit further includes an identifier of a virtual machine that generates the first data flow and a multi-tuple of the first data flow.

According to a fourth aspect, a status synchronizing server is provided, including a receiving circuit, a sending circuit, a processor, and a memory, where the receiving circuit is configured to receive a first request sent by a first security device node, where the first request carries a first flow entry of a first data flow that is currently detected by the first security device node, and a flow entry is used to uniquely identify a data flow; the memory is configured to store an instruction for the processor to determine first network data flow detection status corresponding to the first flow entry; and the sending circuit is configured to send a first response to the first security device node, where the first response carries the first network data flow detection status determined by the processor, so that the first security device node maintains, according to the first response, second network data flow detection status that corresponds to the first flow entry and is stored on the first security device node.

According to a fifth aspect, a security device node is provided, including: a sending unit configured to send a first request to a status synchronizing server, where the first request carries a first flow entry of a first data flow that is currently detected by the security device node, and a flow entry is used to uniquely identify a data flow; a receiving unit configured to receive a first response that is sent by the status synchronizing server according to the first request, where the first response carries first network data flow detection status corresponding to the first flow entry; and a maintaining unit configured to maintain, according to the first response, second network data flow detection status that corresponds to the first flow entry and is stored on the security device node.

With reference to the fifth aspect, in an implementation manner, the security device node further includes an acquiring unit, and the receiving unit is further configured to receive a second request sent by the status synchronizing server, where the second request carries a third flow entry of a third data flow that is currently detected by another security device node; the acquiring unit is configured to acquire third network data flow detection status that corresponds to the third flow entry and is recorded on the security device node; and the sending unit is further configured to send a second response to the status synchronizing server, where the second response carries the third network data flow detection status.

With reference to the fifth aspect and the preceding implementation manner, in another implementation manner, the sending unit is further configured to send a connection request to the status synchronizing server, so that the status synchronizing server authenticates an identity of the security device node according to the connection request; and the receiving unit is further configured to receive information about a request permission of the security device node, where the information about the request permission is configured by the status synchronizing server after the identity authentication succeeds.

With reference to the fifth aspect and the preceding implementation manners, in another implementation manner, the sending unit is further configured to send a status update request to the status synchronizing server according to a preset triggering event or periodically, where the status update request carries a second flow entry of a second data flow that is currently detected by the security device node and corresponding network data flow detection status, so that the status synchronizing server maintains, according to the status update request, a registration record of the flow entry, where the registration record of the flow entry is stored on the status synchronizing server.

With reference to the fifth aspect and the preceding implementation manners, in another implementation manner, the status update request sent by the sending unit further carries an event type, where the event type is used to indicate whether the status update request is sent according to a preset triggering event or periodically.

With reference to the fifth aspect and the preceding implementation manners, in another implementation manner, the first flow entry that is carried in the first request sent by the sending unit includes an identifier of a virtual machine that generates the first data flow and a multi-tuple of the first data flow.

According to a sixth aspect, a security device node is provided, including a receiving circuit, a sending circuit, a processor, and a memory, where the sending circuit is configured to send a first request to a status synchronizing server, where the first request carries a first flow entry of a first data flow that is currently detected by the security device node, and a flow entry is used to uniquely identify a data flow; the receiving circuit is configured to receive a first response that is sent by the status synchronizing server according to the first request, and the first response carries first network data flow detection status corresponding to the first flow entry; and the memory is configured to store an instruction for the processor to maintain, according to the first response, second network data flow detection status that corresponds to the first flow entry and is stored on the security device node.

According to the seventh aspect, a host device is provided, including one or more virtual machines; and the preceding security device node configured to perform security detection for data flows generated by the one or more virtual machines.

According to the eighth aspect, a network system is provided, including the preceding status synchronizing server; and at least one of the preceding host devices, where a data connection is established between a security device node on the host device and the status synchronizing server so as to exchange network data flow detection status corresponding to a data flow that is detected by the security device node.

With reference to the eighth aspect, in an implementation manner, the at least one host device includes a first host device and a second host device, where a first virtual machine on the first host device migrates to the second host device, and a security device node on the second host device acquires, from the status synchronizing server, network data flow detection status before the migration of the first virtual machine.

According to the embodiments of the present invention, a security device node requests previous network data flow detection status of a data flow from a status synchronizing server so as to synchronize network data flow detection status, thereby allowing the security device node to detect a network attack in a more accurate way and improving network system security.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
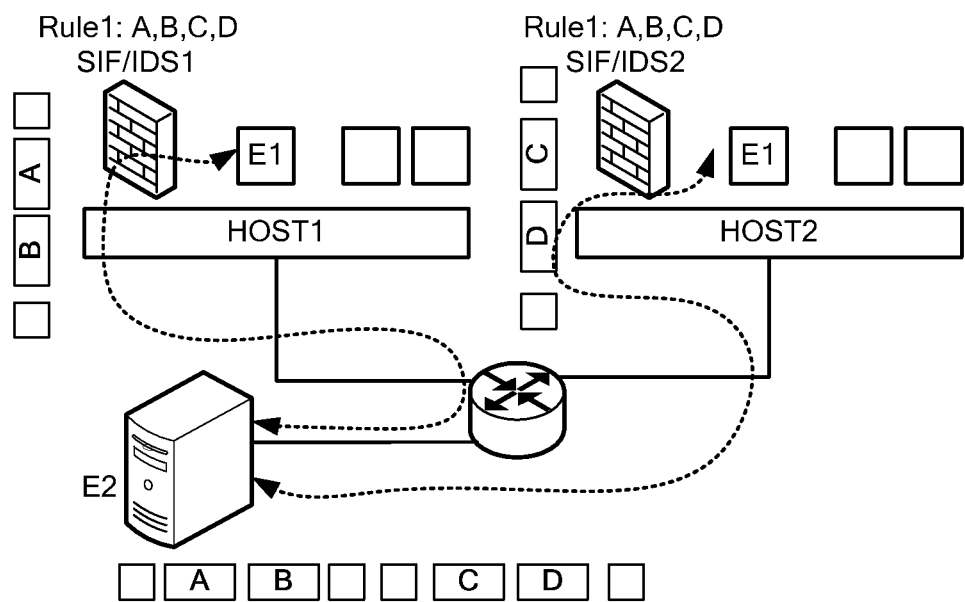
FIG. 1 is a schematic diagram of an example of a scenario to which an embodiment of the present invention may be applied.

FIG. 1 is a schematic diagram of an example of a scenario to which an embodiment of the present invention may be applied. It should be noted that the example of the scenario in FIG. 1 is used only to help a person skilled in the art to understand this embodiment of the present invention rather than limiting this embodiment of the present invention to such an application scenario.

It should be further noted that, though in this embodiment of the present invention, an SIF or IDS acting as a security device node is taken as an example, this embodiment of the present invention does not set a limitation to an application type of the security device node, and other types of methods for stateful detection of network traffic may also be adopted. These applications all fall within the scope of this embodiment of the present invention.

In FIG. 1, communication entity E1 or E2 is a virtual machine, and the virtual machine may migrate. Migration of a virtual machine refers to a conversion from implementing a virtual machine originally based on hardware resources and processing resources of a physical host to implementing it based on hardware resources and processing resources of another physical host. One or more data flows may exist between E1 and E2. Before and after the migration of the virtual machine, more than two security device nodes participate in a "stateful detection of network traffic" process, such as SIF/IDS1 on host HOST1 and SIF/IDS2 on host HOST2, as shown in FIG. 1. Specifically, SIF/IDS1 and SIF/IDS2 are security device nodes that run on hosts HOST1 and HOST2 respectively, responsible for performing a detection function for traffic of all virtual machines on their respective hosts. When E1 is on HOST1, traffic of E1 passes SIF/IDS1, and SIF/IDS1 detects the traffic of E1; and when E1 is on HOST2, SIF/IDS2 detects the traffic of E1.

If security device nodes SIF/IDS1 and SIF/IDS2 cannot keep "network traffic detection status" information synchronized between E1 and E2, an attack detection function related to network status cannot be properly implemented, thereby deteriorating network system security.

Network data flow detection status refers to status of a sequence of network events that are detected by a security device node and have occurred in the network data flow. For example, if a network event A has occurred, the network data flow detection status is A; and if network event A and then network event B have occurred, the current network data flow detection status is A, B. Once the network data flow detection status matches a detection rule, it may be considered that an attack event that matches the description of the Rule occurs.

It is assumed that a same rule Rule1 for detecting an attack is configured on SIF/IDS1 and SIF/IDS2. A sequence of a group of network detection events "A,B,C,D" is used to represent Rule1, that is, when the security device node identifies that events occur in an order of "A,B,C,D", it may be determined that attack event Attack 1 that meets attack characteristics of Rule1 has occurred.

Specifically, as shown in FIG. 1, it is assumed that, after sending network events A and B during a process of communication with E2, E1 migrates from host HOST1 to host HOST2 so as to continue to send network events C and D. In this case, the process of communication between E1 and E2 is not interrupted, E2 receives a complete sequence of network events A, B, C, and D, and a network attack may occur.

In this period, SIF/IDS1 before E1 migration detects occurrence of network events A and B, however it cannot detect occurrence of network events C and D because of incapability to detect a subsequent network event. Though SIF/IDS2 after E1 migration is capable of detecting the occurrence of network events C and D, it cannot obtain a complete sequence of events A, B, C, and D and further cannot discover occurrence of an attack because it cannot obtain detection status indicating that the previous network events A and B have occurred. It can be seen that, under a condition of migration of a virtual machine, though a same attack detection policy Rule1 is configured on SIF/IDS1 and SIF/IDS2, neither SIF/IDS1 nor SIF/IDS2 can detect an attack that occurs between E1 and E2.

Figure 2:
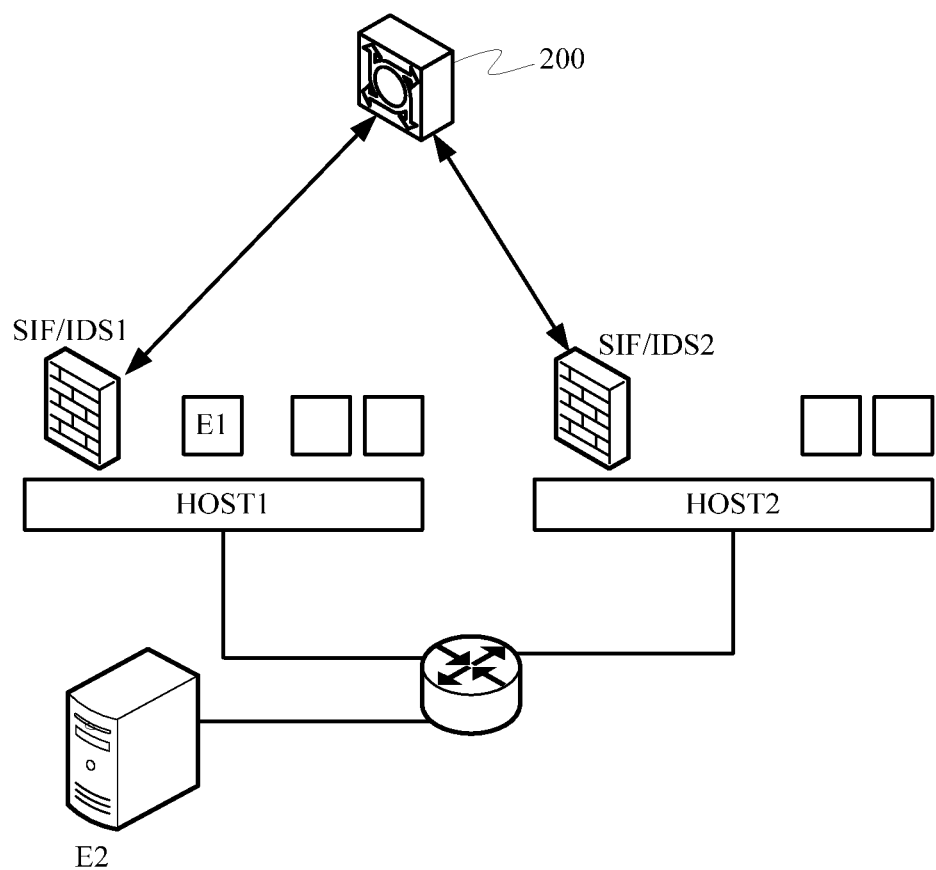
FIG. 2 is a schematic structural diagram of a network system to which an embodiment of the present invention may be applied.

FIG. 2 is a schematic structural diagram of a network system to which an embodiment of the present invention may be applied. In FIG. 2, identical reference signs are used in parts identical to FIG. 1, and duplicate descriptions are properly omitted.

In the embodiment of FIG. 2, a virtualized stateful firewall or intrusion detection system is used in a virtual environment. However, this embodiment of the present invention is not limited to this. For example, this embodiment of the present invention may also be similarly applied to a software defined network (SDN) system. This application also falls within the scope of this embodiment of the present invention.

In FIG. 2, E1 and E2 are entities between which network communication occurs, where E1 is a virtual machine. E1 currently runs on host HOST1 and will migrate to host HOST2.

SIF/IDS1 and SIF/IDS2 are security device nodes that run on hosts HOST1 and HOST2 respectively, responsible for performing a detection function for traffic of all virtual machines on their respective hosts. When E1 is on HOST1, traffic of E1 passes SIF/IDS1, and SIF/IDS1 detects the traffic of E1; and when E1 is on HOST2, SIF/IDS2 detects the traffic of E1.

The network system in this embodiment of the present invention includes a status synchronizing server 200. This embodiment of the present invention does not set a limitation to a specific implementation manner of the status synchronizing server 200. For example, it may be an independently disposed server, and it may be located on a general server or another network device, for example, it may be located on a certain host. In addition, FIG. 2 describes only one status synchronizing server 200 for brevity. However, this embodiment of the present invention does not set a limitation to the number of status synchronizing servers 200. For example, multiple status synchronizing servers 200 may be used to collaboratively or independently provide a status synchronization function for a security device node. These implementation manners all fall within the scope of this embodiment of the present invention.

Both SIF/IDS1 and SIF/IDS2 have a data connection with the status synchronizing server 200. Specifically, SIF/IDS1 and SIF/IDS2 may exchange information about network data flow detection status related to E1 with the status synchronizing server 200.

SIF/IDS1 and SIF/IDS2 may synchronize the information about network data flow detection status related to E1 through their respective connections with the status synchronizing server 200, that is, in a manner of forwarding by the status synchronizing server 200. In addition, a direct connection may be established between SIF/IDS1 and SIF/IDS2. In this way, the information about network data flow detection status related to E1 is exchanged without being forwarded by the status synchronizing server 200. These implementation manners all fall within the scope of this embodiment of the present invention.

Both SIF/IDS1 and SIF/IDS2 may obtain rule Rule1 for detecting an attack. Rule1 is described by network events A, B, C, and D. Occurrence of a sequence of network events A, B, C, and D indicates that an attack event that matches the description in Rule1 occurs.

It should be noted that, FIG. 1 and FIG. 2 only depict a scenario where E1 migrates only once. However, this embodiment of the present invention is not limited to this, and similarly, it may also be applied to a scenario where E1 migrates for multiple times. This application also falls within the scope of this embodiment of the present invention.

Figure 3:
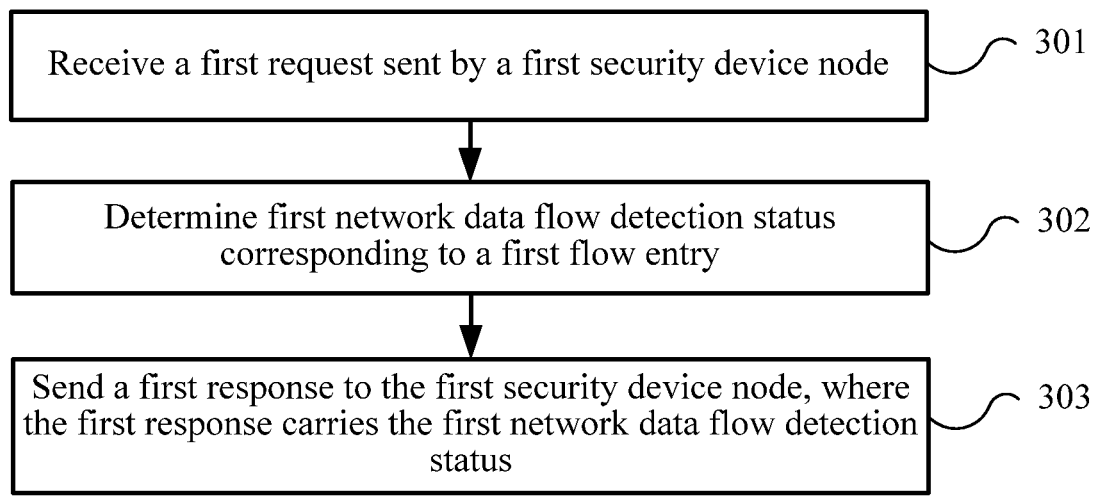
FIG. 3 is a flowchart of a method for synchronizing network data flow detection status according to an embodiment of the present invention.

FIG. 3 is a flowchart of a method for synchronizing network data flow detection status according to an embodiment of the present invention. The method in FIG. 3 is executed by a status synchronizing server (for example, the status synchronizing server 200 shown in FIG. 2).

301. Receive a first request sent by a first security device node (for example, SIF/IDS1 or SIF/IDS2 shown in FIG. 1 and FIG. 2). The first request carries a first flow entry of a first data flow that is currently detected by the first security device node.

A security device node identifies each detected data flow with a flow entry. The flow entry may be a data structure used to uniquely identify a data flow. For example, as shown in FIG. 1 and FIG. 2, a data flow between virtual machines E1 and E2 may be represented by using a flow entry E1-E2-FLOW1. However, this embodiment of the present invention does not set a limitation to a specific name of a flow entry. For example, when only one data flow exists between virtual machines E1 and E2, a flow entry of the data flow may be called E1-E2. Alternatively, other forms may be used to tell apart multiple data flows between E1 and E2. In this case, a data structure of the first flow entry carried in the first request is shown in Table 1.

TABLE 1

| Example of a data structure of the first flow entry carried in the first request Flow Entry |
|---|
| E1-E2-FLOW1 |

Optionally, as an embodiment, the first flow entry that is carried in the first request received in step 301 may include an identifier of a virtual machine that generates the first data flow and a multi-tuple of the first data flow. Specifically, scenarios in FIG. 1 and FIG. 2 are taken as an example, the flow entry E1-E2-FLOW1 may include unique identifiers of virtual machines E1 and E2, for example, they may be Media Access Control (MAC) addresses of E1 and E2, virtual machine identities (VM_ID) of E1 and E2, or other information, so that the security device node performs, according to the virtual machine identifiers in combination with a control policy that includes the virtual machine identifiers, control over traffic of certain selected virtual machines; and the flow entry may further include multi-tuple information of the data flow itself, such as, a source MAC address or a destination MAC address, a source Internet Protocol (IP) address or a destination IP address, a source port or a destination port, and a protocol type.

Table 2 is an example of a data structure of a flow entry that may be adopted in this embodiment of the present invention. However, as long as the flow entry is capable of uniquely identifying a data flow, this embodiment of the present invention does not set a limitation to specific information carried in the flow entry.

TABLE 2

Example of a structure of a flow entry

| VM Attribute | Data Flow Network Attribute |
|---|---|
| MAC address or VM_ID | Source/destination MAC address, source/destination IP address, source/destination port, and protocol type |

302. Determine first network data flow detection status corresponding to the first flow entry.

This embodiment of the present invention does not set a limitation to a specific method for the status synchronizing server to determine the first network data flow detection status. For example, the status synchronizing server may read the first network data flow detection status locally cached or may acquire the first network data flow detection status from another device (for example, another security device node).

Optionally, as an embodiment, the status synchronizing server may firstly query a locally stored registration record of the first flow entry, that is, querying whether the registration record of the first flow entry is locally stored. Then, the status synchronizing server may determine, according to a result of the query, the first network data flow detection status corresponding to the first flow entry. A registration record of a flow entry includes the flow entry as well as a security device node and network data flow detection status that correspond to the flow entry.

Table 3 is an example of a registration record of a flow entry on the status synchronizing server. In the example of Table 3, a security device node corresponding to the flow entry E1-E2-FLOW1 is SIF/IDS1. Network data flow detection status corresponding to the flow entry E1-E2-FLOW1 is recorded in a "Status Cache" field. In the example of Table 2, network data flow detection status corresponding to the flow entry E1-E2-FLOW1 is NULL. In this embodiment of the present invention, a specific value may be used to indicate that a field is NULL.

TABLE 3

Example of a registration record of a flow entry saved on the status synchronizing server

| Flow Entry | Security Device Node | Status Cache |
|---|---|---|
| E1-E2-FLOW1 | SIF/IDS1 | NULL |

In addition, a Security Device Node field may also be NULL, which may exemplarily be used to indicate that a corresponding security device node is inaccessible or does not exist, information about a corresponding security device node has been lost, or the like.

The status synchronizing server may store multiple registration records as shown in Table 3 so as to store security device nodes and network data flow detection status that correspond to various flow entries.

Optionally, as an embodiment, during determining, according to the result of the query, the first network data flow detection status corresponding to the first flow entry, if no registration record of the first flow entry is found, a registration record of the first flow entry may be locally added, network data flow detection status corresponding to the first flow entry is set to NULL in the registration record, and it is determined that the first network data flow detection status is NULL. Optionally, in this case, a correspondence between the first flow entry and the first security device node may be recorded, that is, a security device node corresponding to the first flow entry in the added registration record is set to the first security device node.

Optionally, as another embodiment, during determining, according to the result of the query, the first network data flow detection status corresponding to the first flow entry, if the registration record of the first flow entry is found, the first network data flow detection status corresponding to the first flow entry is determined according to information about a security device node corresponding to the first flow entry in the registration record.

If the status synchronizing server stores the registration record of the first flow entry, the security device node and the network data flow detection status that correspond to the first flow entry may be acquired according to the registration record shown in Table 3. However, in this case, the network data flow detection status may not be the latest and may be reported by another security device node in a previous period or may be set by the status synchronizing server in a previous period.

Optionally, when a security device node corresponding to the first flow entry in the registration record is NULL, network data flow detection status corresponding to the first flow entry in the registration record is directly determined as the first network data flow detection status. If the security device node is NULL, it indicates that new network data flow detection status cannot be currently obtained from another security device node.

Optionally, as another embodiment, when a security device node corresponding to the first flow entry in the registration record is a second security device node, a second request is sent to the second security device node. The second request carries the first flow entry so as to request the second security device node to send third network data flow detection status that corresponds to the first flow entry and is recorded on the second security device node. For example, according to Table 3, it may be found that a security device node corresponding to the flow entry E1-E2-FLOW1 is SIF/IDS1. In this case, an attempt may be made to request the first network data flow detection status from SIF/IDS1. Table 4 is an example of a data structure of the first flow entry carried in the second request.

TABLE 4

Example of a data structure of the first
flow entry carried in the second request
Flow Entry

E1-E2-FLOW1

When no response to the second request is received from the second security device node, the network data flow detection status corresponding to the first flow entry in the registration record is determined as the first network data flow detection status. For example, as the second security device node is inaccessible, the status synchronizing server may take network data flow detection status that is locally cached and corresponds to the first flow entry as the first network data flow detection status.

When the third network data flow detection status sent by the second security device node is received, network data flow detection status corresponding to the first flow entry in the local registration record of the first flow entry is updated to the third network data flow detection status, and the third network data flow detection status is determined as the first network data flow detection status. It should be noted that the third network data flow detection status may be NULL or a specific value. In this way, the first network data flow detection status is the latest network data flow detection status of the first data flow.

Optionally, in this case, a correspondence between the first flow entry and the first security device node may be recorded, that is, the security device node corresponding to the first flow entry in the registration record is updated to the first security device node.

303. Send a first response to the first security device node, where the first response carries the first network data flow detection status, so that the first security device node maintains, according to the first response, second network data flow detection status that corresponds to the first flow entry and is stored on the first security device node.

Optionally, an example of a data structure carried in the first response may be shown in Table 5.

TABLE 5

An example of a data structure carried in the first response

| Flow Entry | Network Data Flow Detection Status |
|---|---|
| E1-E2-FLOW1 | NULL |

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

With reference to specific examples, the following describes in further detail a process where the status synchronizing server synchronizes network data flow detection status.

Optionally, as an embodiment, before step 301, the status synchronizing server may further receive a connection request sent by the first security device node and authenticates an identity of the first security device node according to the connection request, so as to configure a request permission of the first security device node. For example, a security device node may request a connection to the status synchronizing server after being enabled, and the status synchronizing server configures, for the security device node, a permission to query and report information. The permission may include an instruction about whether to allow the security device node to perform querying or reporting; and optionally, may further include parameters corresponding to querying or reporting performed by the security device node, for example, a report period. This embodiment of the present invention does not set a limitation to a period for executing the preceding connection request process. The process may be executed when the security device node is initially enabled or be executed when the security device node needs to query or report information. These changes all fall within the scope of this embodiment of the present invention.

Optionally, as another embodiment, the status synchronizing server may further receive a status update request that is sent by a third security device node according to a preset triggering event or periodically. The status update request may carry a second flow entry of a second data flow that is currently detected by the third security device node and corresponding network data flow detection status. Then, the status synchronizing server may maintain locally stored registration record of flow entries according to the status update request. For example, the third security device node may actively send flow entries of all or partial data flows that are currently detected and corresponding network data flow detection status to the status synchronizing server.

For example, when no registration record of the second flow entry is locally stored, the status synchronizing server may add a registration record of the second flow entry. Alternatively, when the registration record of the second flow entry is locally stored and a security device node corresponding to the second flow entry in the registration record is the third security device node, the status synchronizing server may update, by using network data flow detection status that corresponds to the second flow entry and is carried in the status update request, network data flow detection status that is locally recorded and corresponds to the second flow entry. Alternatively, when the registration record of the second flow entry is locally stored and a security device node corresponding to the second flow entry is not the third security device node, the status synchronizing server may ignore the status update request.

Optionally, as another embodiment, the status update request may further carry an event type. The event type is used to indicate whether the status update request is sent according to the preset triggering event or periodically. In this case, during maintaining, according to the status update request, locally stored registration record of flow entries, the status synchronizing server may set a security device node corresponding to the second flow entry to NULL in a case where the event type indicates that the status update request is sent according to the preset triggering event; and set the security device node corresponding to the second flow entry to the third security device node in a case where the event type indicates that the status update request is sent periodically.

Figure 4:
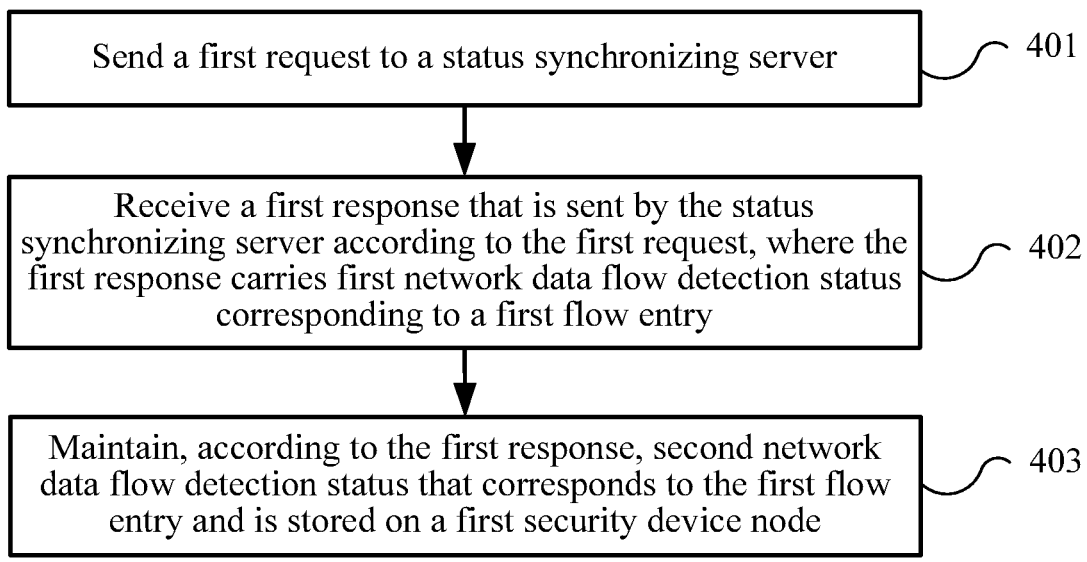
FIG. 4 is a flowchart of a method for synchronizing network data flow detection status according to another embodiment of the present invention.

FIG. 4 is a flowchart of a method for synchronizing network data flow detection status according to another embodiment of the present invention. The method in FIG. 4 is executed by a first security device node (for example, SIF/IDS1 or SIF/IDS2 shown in FIG. 1 and FIG. 2).

401. Send a first request to a status synchronizing server (for example, the status synchronizing server 200 shown in FIG. 2). The first request carries a first flow entry of a first data flow that is currently detected by the first security device node. A flow entry is used to uniquely identify a data flow.

A security device node identifies each detected data flow with a flow entry. The flow entry may be a data structure used to uniquely identify a data flow. For example, as shown in FIG. 1 and FIG. 2, a data flow between virtual machines E1 and E2 may be represented by using a flow entry E1-E2-FLOW1. In this case, a data structure of the first flow entry carried in the first request may be shown in Table 1.

Optionally, as an embodiment, the first flow entry that is carried in the first request sent in step 401 may include an identifier of a virtual machine that generates the first data flow and a multi-tuple of the first data flow. Specifically, scenarios in FIG. 1 and FIG. 2 are taken as an example, the flow entry E1-E2-FLOW1 may include unique identifiers of virtual machines E1 and E2, for example, they may be MAC addresses of E1 and E2, VM_IDs of E1 and E2, or other information. The flow entry may further include multi-tuple information of the data flow itself, such as, a source MAC address or a destination MAC address, a source IP address or a destination IP address, a source port or a destination port, and a protocol type.

Table 2 is an example of a data structure of a flow entry that may be adopted in this embodiment of the present invention. However, as long as the flow entry is capable of uniquely identifying a data flow, this embodiment of the present invention does not set a limitation to specific information carried in the flow entry.

402. Receive a first response that is sent by the status synchronizing server according to the first request, where the first response carries first network data flow detection status corresponding to the first flow entry.

Optionally, an example of a data structure carried in the first response may be shown in Table 5.

403. Maintain, according to the first response, second network data flow detection status that corresponds to the first flow entry and is stored on the first security device node.

An example of a data structure of the flow entry and the corresponding network data flow detection status may be shown in Table 6, where the data structure is maintained on the first security device node.

TABLE 6

| An example of a data structure saved on a security device node | |
|---|---|
| Flow Entry | Network Data Flow Detection Status |
| E1-E2-FLOW1 | StatusA,B |

In the example of Table 6, StatusA,B indicates that network events A and B have been detected in a data flow corresponding to the flow entry E1-E2-FLOW1.

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

Optionally, as an embodiment, the first security device node may further receive a second request sent by the status synchronizing server, where the second request carries a third flow entry of a third data flow that is currently detected by a fourth security device node; acquire third network data flow detection status that corresponds to the third flow entry and is recorded on the first security device node; and send a second response to the status synchronizing server, where the second response carries the third network data flow detection status. In this way, a security device node is capable of sending, according to a request of a status synchronizing server, network data flow detection status saved on the security device node to the status synchronizing server, so as to update corresponding network data flow detection status on the status synchronizing server or another security device node.

Optionally, as another embodiment, before step 401, the first security device may further send a connection request to the status synchronizing server, so that the status synchronizing server authenticates an identity of the first security device node according to the connection request. The first security device node may receive information about a request permission of the first security device node, where the information about the request permission is configured by the status synchronizing server after the identity authentication succeeds. For example, a security device node may request a connection to the status synchronizing server after being enabled, and the status synchronizing server configures, for the security device node, a permission to query and report information. The permission may include an instruction about whether to allow the security device node to perform querying or reporting; and optionally, may further include parameters corresponding to querying or reporting performed by the security device node, for example, a report period. This embodiment of the present invention does not set a limitation to a period for executing the preceding connection request process. The process may be executed when the security device node is initially enabled or be executed when the security device node needs to query or report information. These changes all fall within the scope of this embodiment of the present invention.

Optionally, as another embodiment, the first security device node may send a status update request to the status synchronizing server according to a preset triggering event or periodically. The status update request carries a second flow entry of a second data flow that is currently detected by the first security device node and corresponding network data flow detection status, so that the status synchronizing server maintains, according to the status update request, a registration record of the flow entry, where the registration record is recorded on the status synchronizing server. For example, the first security device node may actively send flow entries of all or partial data flows that are currently detected and corresponding network data flow detection status to the status synchronizing server.

Optionally, as another embodiment, the status update request may further carry an event type. The event type is used to indicate whether the status update request is sent according to the preset triggering event or periodically. In this way, the status synchronizing server may perform corresponding processing according to the event type. For example, the status synchronizing server may set a security device node corresponding to the second flow entry to NULL in a case where the event type indicates that the status update request is sent according to the preset triggering event; and set the security device node corresponding to the second flow entry to a third security device node in a case where the event type indicates that the status update request is sent periodically.

With reference to specific examples, the following describes in further detail embodiments concerning a process for updating network data flow detection status according to this embodiment of the present invention. It should be noted that the examples given below are only used to help a person skilled in the art better understand this embodiment of the present invention rather than limiting the scope of this embodiment of the present invention.

Figure 5:
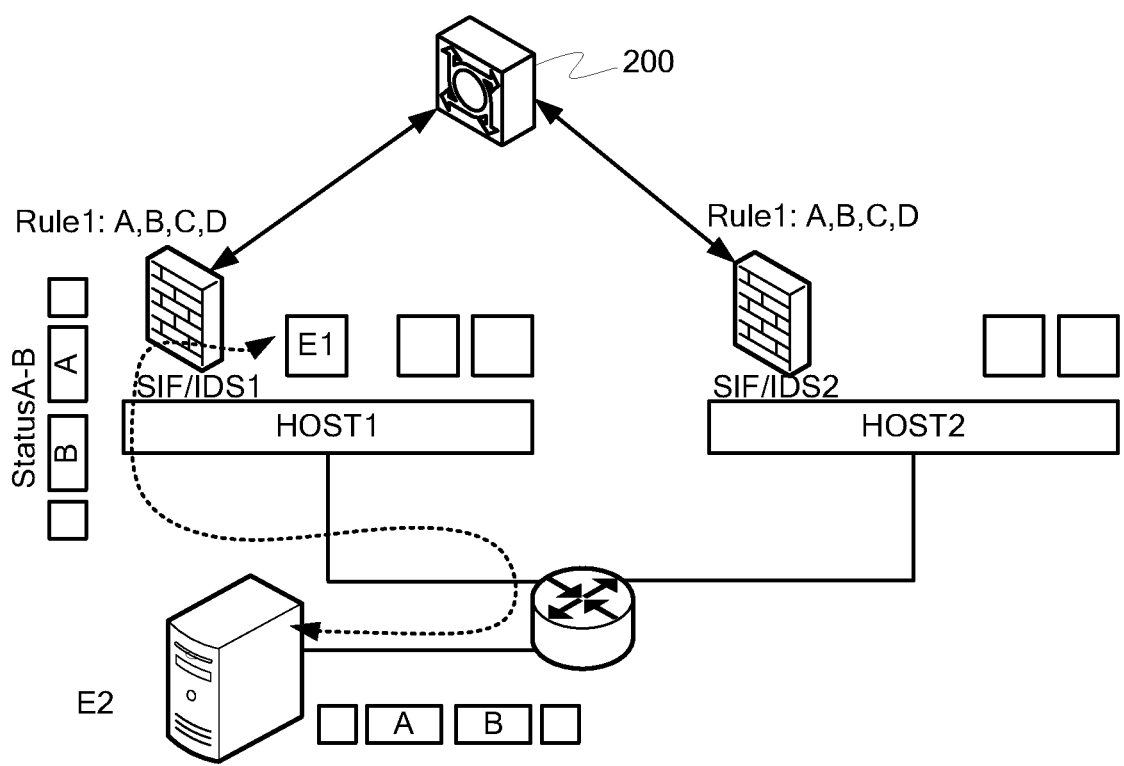
FIG. 5 is a schematic diagram of a network scenario before migration of a virtual machine according to an embodiment of the present invention.
Figure 6:
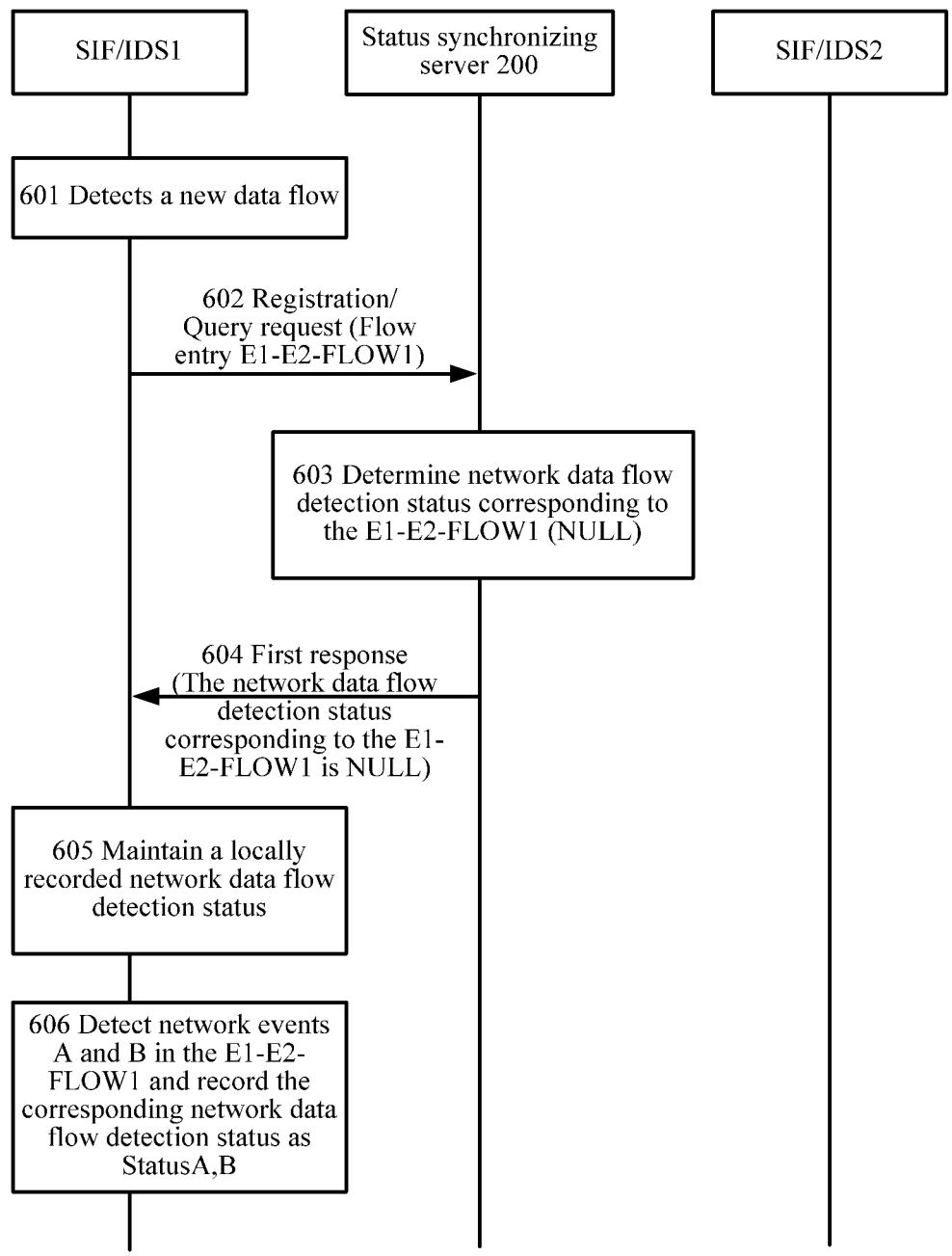
FIG. 6 is a schematic diagram of a status synchronization process in the scenario shown in FIG. 5.

FIG. 5 is a schematic diagram of a network scenario before migration of a virtual machine. FIG. 6 is a schematic diagram of a status synchronization process in the scenario shown in FIG. 5. In FIG. 5, identical reference signs are used in parts identical to FIG. 1 and FIG. 2, and therefore, duplicate descriptions are properly omitted.

As shown in FIG. 5, virtual machine E1 is located on host HOST1. A data flow between E1 and E2 is represented by using a flow entry E1-E2-FLOW1. Security device node SIF/IDS1 on host HOST1 detects all data flows of virtual machine E1, including E1-E2-FLOW1. In addition, host HOST2 has security device node SIF/IDS2. If it is unnecessary to tell apart two security device nodes SIF/IDS1 and SIF/IDS2 in the following, they may be uniformly called a security device node SIF/IDS.

The following describes the status synchronization process in FIG. 6 with reference to FIG. 5.

601. SIF/IDS1 detects a new data flow.

Specifically, after receiving a data packet during communication between E1 and E2, SIF/IDS1 firstly determines whether a flow entry of a data flow exists among all currently maintained flow entries, where the data packet belongs to the flow entry of the data flow. If yes, SIF/IDS1 performs detection for the data flow according to the currently maintained flow entry of the data flow and a corresponding detection rule, and updates, according to a discovered network event, network data flow detection status corresponding to the flow entry. If the received data packet does not belong to any existing flow entry that is currently maintained by SIF/IDS1, it indicates that the data flow is a new network data flow for SIF/IDS1, and SIF/IDS1 establishes, for the data flow, a corresponding data structure of the flow entry. The data structure of the flow entry may be shown in Table 2.

In the embodiment of FIG. 6, it is assumed that a data flow of the flow entry E1-E2-FLOW1 is a new data flow that is detected by SIF/IDS1 for the first time.

602. SIF/IDS1 submits a registration/query request, that is, a first request that carries the flow entry E1-E2-FLOW1 shown in Table 1, to a status synchronizing server 200, where the registration/query request corresponds to the flow entry E1-E2-FLOW1.

603. The status synchronizing server 200 determines network data flow detection status corresponding to the flow entry E1-E2-FLOW1.

As the data flow of the flow entry E1-E2-FLOW1 is a new data flow, no corresponding network data flow detection status exists in the status synchronizing server 200. Therefore, the status synchronizing server 200 determines in step 603 that the network data flow detection status corresponding to the flow entry E1-E2-FLOW1 is NULL.

Specifically, after obtaining the registration/query request for the network data flow detection status corresponding to the flow entry E1-E2-FLOW1, where the registration/query request is submitted by SIF/IDS1, the status synchronizing server 200 queries in its system whether a registration record of the flow entry E1-E2-FLOW1 exists. An example of a data structure of a registration record of the flow entry may be shown in Table 3, where the registration record is saved on the status synchronizing server 200.

If the registration record of the flow entry E1-E2-FLOW1 does not exist, it indicates that this data flow is also a newly occurred data flow for the status synchronizing server 200. In this case, the status synchronizing server 200 performs a registration operation for the flow entry, that is, recording the flow entry E1-E2-FLOW1 and a corresponding security device node (SIF/IDS1). If the registration record of the flow entry E1-E2-FLOW1 exists, the status synchronizing server 200 sends the query request to a security device node corresponding to the flow entry E1-E2-FLOW1 in the registration record of E1-E2-FLOW1, obtains, from the corresponding security device node, current network data flow detection status corresponding to the flow entry E1-E2-FLOW1, returns the obtained detection status to the security device node (SIF/IDS1) that submits the registration request, and meanwhile changes the security device node corresponding to the flow entry E1-E2-FLOW1 to the node (that is, SIF/IDS1) that submits the registration request.

In the embodiment of FIG. 6, the status synchronizing server 200 will add the registration record of the flow entry E1-E2-FLOW1, where the registration record is submitted by SIF/IDS1, and record SIF/IDS1 as the "security device node" corresponding to the flow entry E1-E2-FLOW 1.

604. The status synchronizing server 200 returns a first response to SIF/IDS1.

An example of a data structure carried in the first response may be shown in Table 5. In the embodiment of FIG. 6, the network data flow detection status corresponding to the flow entry E1-E2-FLOW1 is NULL.

605. SIF/IDS1 maintains, according to the first response, the network data flow detection status recorded on SIF/IDS1.

In the embodiment of FIG. 6, SIF/IDS1 determines that the network data flow detection status returned by the status synchronizing server 200 is NULL. Therefore, SIF/IDS1 sets the network data flow detection status that is locally recorded and corresponds to the flow entry E1-E2-FLOW1 to NULL, as shown in Table 7 below:

TABLE 7

Another example of a data structure saved on a security device node

| Flow Entry | Network Data Flow Detection Status |
|---|---|
| E1-E2-FLOW1 | NULL |

606. After detecting traffic of E1-E2-FLOW1 and discovering a network event described in Rule1, SIF/IDS1 changes the network data flow detection status corresponding to the flow entry E1-E2-FLOW1. For example, after network events A and B occur, SIF/IDS1 updates the network data flow detection status corresponding to the flow entry E1-E2-FLOW1 to "StatusA,B", as shown in the example of Table 6.

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

Figure 7:
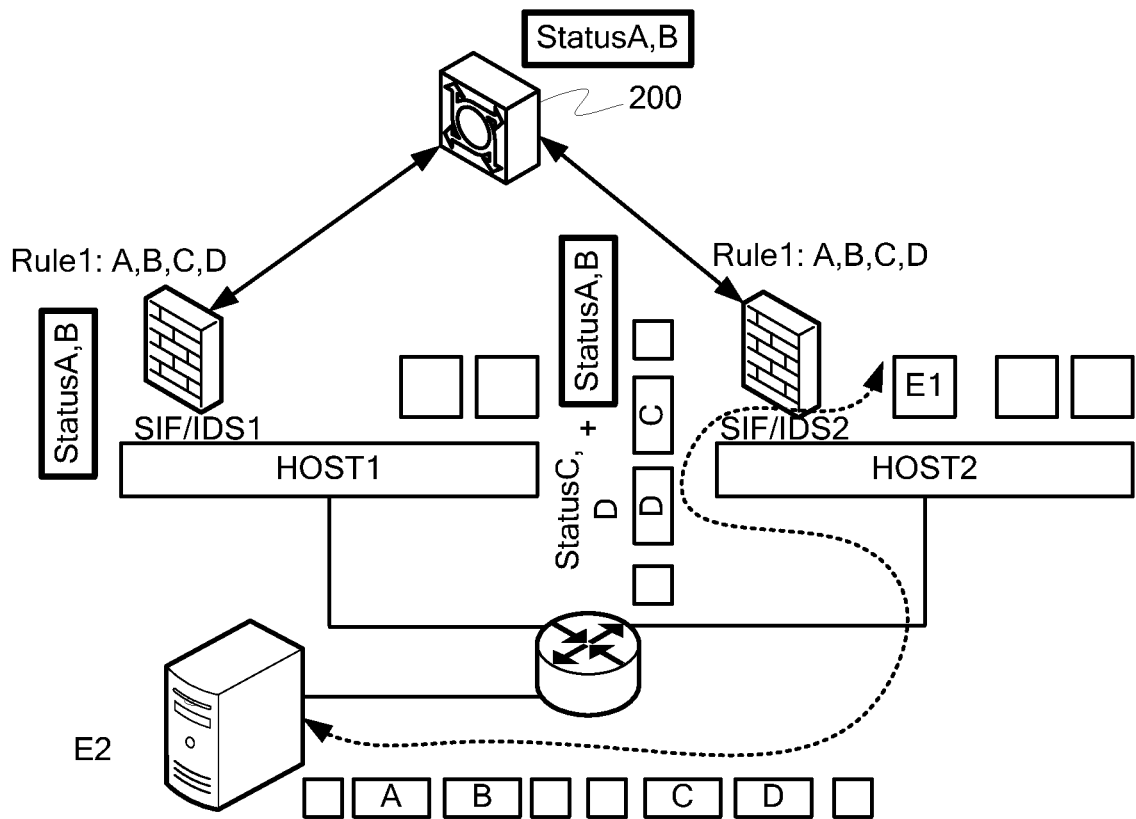
FIG. 7 is a schematic diagram of a network scenario after migration of a virtual machine according to an embodiment of the present invention.
Figure 8:
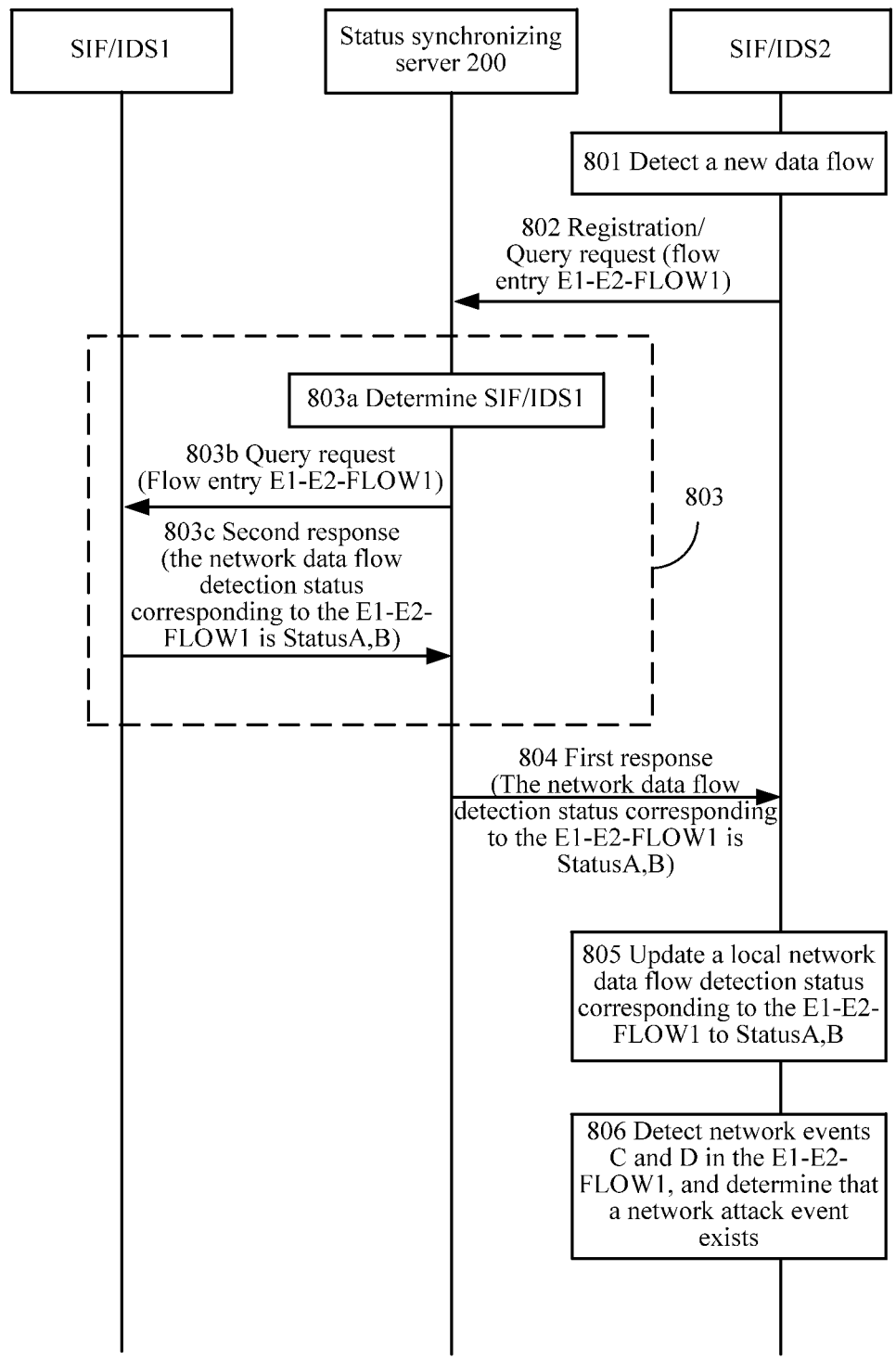
FIG. 8 is a schematic diagram of a status synchronization process in the scenario shown in FIG. 7.

FIG. 7 is a schematic diagram of a network scenario after migration of a virtual machine. FIG. 8 is a schematic diagram of a status synchronization process in the scenario shown in FIG. 7. In FIG. 7, identical reference signs are used in parts identical to FIG. 5, and therefore, duplicate descriptions are properly omitted.

As shown in FIG. 7, virtual machine E1 migrates from host HOST1 to host HOST2. In the migration process, a data flow between E1 and E2 is kept uninterrupted, and therefore, it is represented by using a same flow entry E1-E2-FLOW1. After virtual machine E1 migrates, security device node SIF/IDS2 on host HOST2 detects all data flows of virtual machine E1, including E1-E2-FLOW1.

The following describes the status synchronization process in FIG. 8 with reference to FIG. 7. It is assumed that the process in FIG. 8 is executed after the process 601-606 in FIG. 6, that is, SIF/IDS1 has detected network events A and B in a data flow of the flow entry E1-E2-FLOW1. In this case, if SIF/IDS2 cannot synchronize network events A and B, neither SIF/IDS1 nor SIF/IDS2 is capable of detecting an attack that occurs in the E1-E2-FLOW1 even if SIF/IDS2 is capable of detecting new network events C and D in the data flow of the flow entry E1-E2-FLOW1, thereby deteriorating network security.

801. SIF/IDS2 detects a new data flow.

Specifically, after receiving a data packet during communication between E1 and E2, SIF/IDS2 firstly determines whether a flow entry of a data flow exists among all currently maintained flow entries, where the data packet belongs to the flow entry of the data flow. If yes, SIF/IDS2 performs detection for the data flow according to the currently maintained flow entry of the data flow and a corresponding detection rule, and updates, according to a discovered network event, network data flow detection status corresponding to the flow entry. If the received data packet does not belong to any existing flow entry that is currently maintained by SIF/IDS2, it indicates that the data flow is a new network data flow for SIF/IDS2, and SIF/IDS2 establishes, for the data flow, a corresponding data structure of the flow entry. The data structure of the flow entry may be shown in Table 2.

In the embodiment of FIG. 8, the data flow of the flow entry E1-E2-FLOW1 is a new data flow that is detected by SIF/IDS2 for the first time.

802. SIF/IDS2 submits a registration/query request, that is, a first request that carries the flow entry E1-E2-FLOW1 shown in Table 1, to a status synchronizing server 200, where the registration/query request corresponds to the flow entry E1-E2-FLOW1.

803. The status synchronizing server 200 determines network data flow detection status corresponding to the flow entry E1-E2-FLOW1.

Specifically, after obtaining the registration/query request for the network data flow detection status corresponding to the flow entry E1-E2-FLOW1, where the registration/query request is submitted by SIF/IDS2, the status synchronizing server 200 queries in its system whether a registration record of the flow entry E1-E2-FLOW1 exists. An example of a data structure of a registration record of the flow entry may be shown in Table 3, where the registration record is saved on the status synchronizing server 200.

If the registration record of the flow entry E1-E2-FLOW1 does not exist, it indicates that this data flow is also a newly occurred data flow for the status synchronizing server 200. In this case, the status synchronizing server 200 performs a registration operation for the flow entry, that is, recording the flow entry E1-E2-FLOW1 and a corresponding security device node (SIF/IDS2).

However, in the embodiment of FIG. 8, the status synchronizing server 200 has stored the registration record of the flow entry E1-E2-FLOW1. Therefore, step 803 includes:

803a. The status synchronizing server 200 determines through a query that a security device node corresponding to the flow entry E1-E2-FLOW1 is SIF/IDS1 (see the setting operation in step 603 of FIG. 6).

803b. The status synchronizing server 200 sends SIF/IDS1 a query request, that is, the second request that is shown in Table 4, and carries the flow entry E1-E2-FLOW1. In this way, SIF/IDS1 is capable of determining that network data flow detection status that is locally recorded and corresponds to the flow entry E1-E2-FLOW1 is "StatusA,B" (see the setting operation in step 606 of FIG. 6).

803c. The status synchronizing server 200 receives a second response from SIF/IDS1, where network data flow detection status carried in the second response is "StatusA,B".

An example of a data structure carried in the second response may be shown in Table 8.

TABLE 8

An example of a data structure carried in the second response

| Flow Entry | Network Data Flow Detection Status |
|---|---|
| E1-E2-FLOW1 | StatusA,B |

In this way, the status synchronizing server 200 determines that the network data flow detection status corresponding to the flow entry E1-E2-FLOW1 is "StatusA,B". Optionally, the status synchronizing server 200 may update the network data flow detection status to "StatusA,B", where the network data flow detection status corresponds to the flow entry E1-E2-FLOW1 and is in a local registration record of E1-E2-FLOW1.

804. The status synchronizing server 200 returns a first response to SIF/IDS2.

An example of a data structure carried in the first response may be shown in Table 9. In the embodiment of FIG. 8, the network data flow detection status corresponding to the flow entry E1-E2-FLOW1 is "StatusA,B".

TABLE 9

Another example of a data structure carried in the first response

| Flow Entry | Network Data Flow Detection Status |
|---|---|
| E1-E2-FLOW1 | StatusA,B |

Optionally, the status synchronizing server 200 may change the security device node corresponding to the flow entry E1-E2-FLOW1 in the registration record to the node that submits the registration request (that is, SIF/IDS2).

805. SIF/IDS2 maintains, according to the first response, the network data flow detection status recorded on SIF/IDS2.

In the embodiment of FIG. 8, SIF/IDS2 determines that the value of the network data flow detection status returned by the status synchronizing server 200 is not NULL. It indicates that the data flow has had detection status of another security device, SIF/IDS2 needs to record the value of the network data flow detection status, which is returned by the status synchronizing server 200, into a parameter of network data flow detection status corresponding to a local flow entry E1-E2-FLOW1 of SIF/IDS2. A result of the update is shown in Table 6.

806. SIF/IDS2 continues to perform traffic detection on the basis of the network data flow detection status maintained in step 805.

Specifically, after detecting traffic of E1-E2-FLOW1 and discovering a network event described in Rule1, SIF/IDS2 changes the network data flow detection status corresponding to the flow entry E1-E2-FLOW1. For example, after network events C and D are detected, the "network data flow detection status (Status)" corresponding to the flow entry E1-E2-FLOW1 on SIF/IDS2 is "StatusA,B,C,D" and matches Rule1. In this way, SIF/IDS2 is capable of detecting occurrence of a corresponding network attack event.

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

In addition, the embodiments of FIG. 5-FIG. 8 provide a mechanism for synchronizing, before and after a virtual machine migrates, information about existing security detection status of network traffic of the virtual machine between multiple security device nodes that detect the network traffic of the virtual machine. In this way, even under a condition where the virtual machine migrates, a security device node is still capable of normally completing a function of "stateful" network traffic detection for the network traffic of the virtual machine.

With reference to a structure of a flow entry in Table 2, a description related to an attribute ("VM attribute" field) of the virtual machine itself is added to a description about a "flow entry" of a network data flow according to this embodiment of the present invention. In this way, a correspondence may be established between a network flow table and an attribute of a virtual machine. The value of a VM attribute in a flow entry may be NULL. In a case where the value of the VM attribute is NULL, the process in this embodiment of the present invention may be independent of a management platform of the virtual machine. In a case where the value of the VM attribute is not NULL, the process in this embodiment of the present invention may work closely with an operating process of the management platform of the virtual machine, so as to implement a more flexible function and more flexible user experience.

Further, in the embodiment of FIG. 8, because of various reasons, such as SIF/IDS1 shutdown, an internal fault of SIF/IDS1, or a fault that occurs in the communication between SIF/IDS1 and the status synchronizing server 200, the second response cannot be acquired from SIF/IDS1 in step 803c. In this case, the status synchronizing server 200 may carry, in the first response, the network data flow detection status corresponding to the flow entry E1-E2-FLOW1 in the locally cached registration record, and return the first response to SIF/IDS2.

Figure 9:
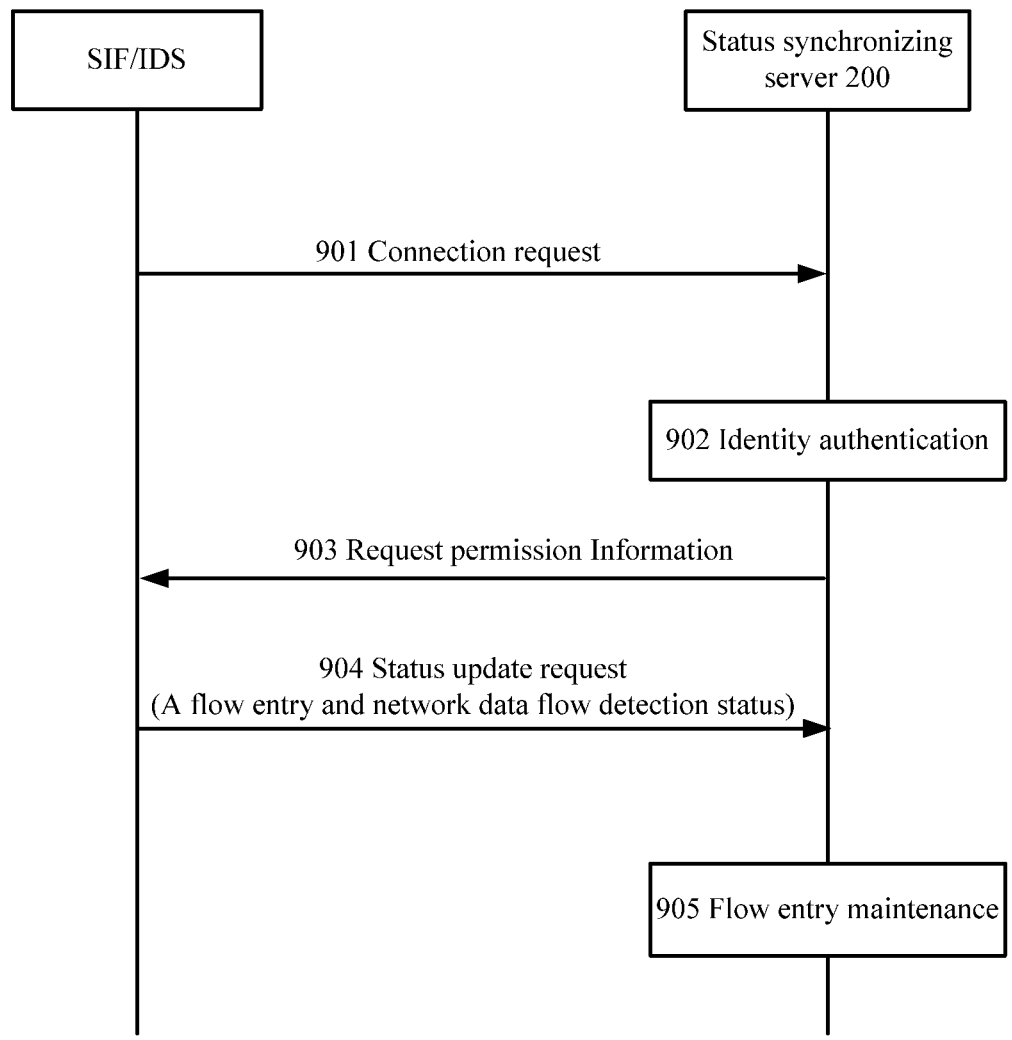
FIG. 9 is a schematic flowchart of a process for connecting and reporting status information according to an embodiment of the present invention.

FIG. 9 is a schematic flowchart of a process for connecting and reporting status information according to an embodiment of the present invention. A security device node SIF/IDS in FIG. 9 may be security device node SIF/IDS1 or SIF/IDS2 shown in FIG. 5-FIG. 8.

901. The security device node SIF/IDS sends a connection request to a status synchronizing server 200.

For example, the security device node SIF/IDS may perform step 901 after being enabled and request registration with the status synchronizing server.

902. The status synchronizing server 200 authenticates an identity of SIF/IDS according to the connection request, and after the authentication succeeds, configures a corresponding request permission, for example, a permission to query or report related information, for the security device node SIF/IDS.

This embodiment of the present invention does not set a limitation to a manner in which the status synchronizing server performs identity authentication, for example, authentication may be performed according to a username/password, authentication may be performed according to a specific encryption algorithm, authentication may be performed according to a certificate, or identity authentication may be performed with the help of a third-party device.

903. The security device node SIF/IDS receives information about the request permission from the status synchronizing server 200.

For example, the status synchronizing server 200 may notify the security device node SIF/IDS whether network data flow detection status can be queried or reported. In addition, if the status synchronizing server 200 allows the security device node SIF/IDS to query or report the network data flow detection status, the status synchronizing server 200 may further notify the security device node SIF/IDS of a specific manner for querying or reporting.

For example, if the security device node SIF/IDS periodically reports the network data flow detection status, the status synchronizing server 200 may further notify, in step 903, the security device node SIF/IDS of the value of a report period, for example, reporting every 10 minutes, every 30 minutes, or every 1 hour. This embodiment of the present invention does not set a limitation to the specific value of a report period.

In addition, the period value may be preset on the security device node SIF/IDS, and in this case, the status synchronizing server 200 does not need to notify the period value.

904. The security device node SIF/IDS sends a status update request to the status synchronizing server 200. The status update request is used to report flow entries of all or partial data flows that are currently detected and corresponding network data flow detection status.

A data structure of the status update request may be shown in Table 10.

TABLE 10

| An example of the status update request | |
|---|---|
| Flow Entry | Network Data Flow Detection Status |
| E1-E2-FLOW1 | StatusA,B |

Optionally, as an embodiment, the security device node SIF/IDS may perform step 904 according to a preset triggering event. This embodiment of the present invention does not set a limitation to a specific type of the preset triggering event.

For example, the security device node SIF/IDS may perform step 904 when a virtual machine migrates, and in this case, the security device node SIF/IDS may report network data flow detection status of a data flow that relates to the migrated virtual machine to the status synchronizing server 200. The security device node SIF/IDS may learn the migration event of the virtual machine through a management platform of the virtual machine.

For another example, the security device node SIF/IDS may perform step 904 during a shutdown, and in this case, the security device node SIF/IDS may report network data flow detection status of all data flows that are detected before the shutdown to the status synchronizing server 200. The security device node SIF/IDS may learn the shutdown event through a scheduled shutdown or in another manner.

Optionally, as another embodiment, the security device node SIF/IDS may perform step 904 periodically. A period for executing step 904 may be configured by the status synchronizing server 200 or may be preset on the security device node SIF/IDS.

If the security device node SIF/IDS may adopt two manners, sending the status update request according to the preset triggering event or sending the status update request periodically, the security device node SIF/IDS may carry, in the status update request, an event type indication used to indicate a manner in which the status update request is sent.

In this case, a data structure of the status update request may be shown in Table 11.

TABLE 11

Another example of the status update request

| Flow Entry | Network Data Flow Detection Status | Event Type |
| --- | --- | --- |
| E1-E2-FLOW1 | StatusA,B | Periodic/Preset triggering event |

905. The status synchronizing server 200 maintains locally stored registration record of flow entries according to the status update request.

When the status update request is received, the status synchronizing server 200 determines the security device node (named a node A) that sends the status update request, and determines a security device node (named a node B) that corresponds to the flow entry in the status update request and is in the locally cached registration record.

In a normal case, the node A and the node B are a same node. If the event type in the status update request indicates periodic sending, the status synchronizing server 200 records the value of "Network Data Flow Detection Status" in the status update request into "Status Cache" corresponding to the flow entry.

In another aspect, if the event type in the status update request indicates sending according to the preset triggering event (for example, a shutdown), the status synchronizing server 200 records the value of "Network Data Flow Detection Status" in the status update request into "Status Cache" corresponding to the flow entry. Optionally, the status synchronizing server 200 may set the value of "Security Device Node" corresponding to the flow entry to NULL at the same time. This case indicates that the security device node is inaccessible. When receiving a query/registration request that relates to a same flow entry and is sent by another security device node, the status synchronizing server 200 directly returns the value of "Status Cache" corresponding to the flow entry to the security device node that sends the query/registration request, and does not perform steps 803a-803c shown in FIG. 8 any longer. This saves query time and improves operating efficiency.

In an abnormal case, the node A and the node B are different nodes. The status synchronizing server 200 may ignore the status update request.

In another abnormal case where the node B does not exist, that is, the flow entry carried in the status update request is not registered with the status synchronizing server 200, the status synchronizing server 200 may perform a registration operation for the flow entry to add a registration record of the flow entry, and record the value of "Network Data Flow Detection Status" into corresponding "Status Cache", where the value of "Network Data Flow Detection Status" is actively submitted by the security device node. In addition, the status synchronizing server 200 may record the security device node corresponding to the flow entry as the node A or record it as NULL. This embodiment of the present invention does not set a limitation to this. For example, if the event type in the status update request indicates periodic sending, the status synchronizing server 200 may record the security device node corresponding to the flow entry in the registration record as the node A. If the event type in the status update request indicates sending according to the preset triggering event (for example, a shutdown), the status synchronizing server 200 may record the security device node corresponding to the flow entry in the registration record as NULL.

In the embodiment of FIG. 9, the security device node SIF/IDS is capable of actively triggering an update of network data flow detection status cached on the status synchronizing server 200. In this way, the network data flow detection status cached on the status synchronizing server 200 is maintained as a possibly latest value. Even if the status synchronizing server 200 cannot request the network data flow detection status from the security device node SIF/IDS before migration due to a shutdown or a fault of the security device node SIF/IDS, it is capable of returning the possibly latest network data flow detection status to the security device node after the migration, thereby improving network security.

Figure 10:
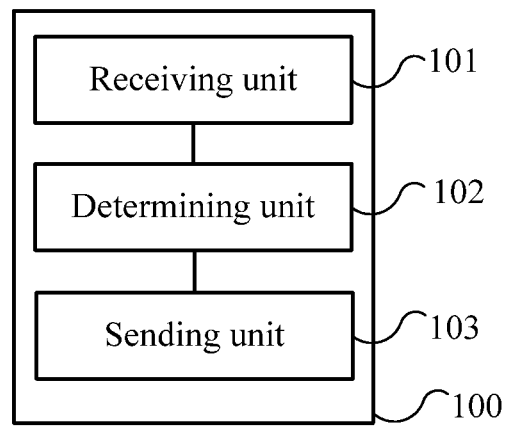
FIG. 10 is a block diagram of a status synchronizing server according to an embodiment of the present invention.

FIG. 10 is a block diagram of a status synchronizing server according to an embodiment of the present invention. An example of a status synchronizing server 100 in FIG. 10 is the status synchronizing server 200 shown in FIG. 2, including a receiving unit 101, a determining unit 102, and a sending unit 103. The receiving unit 101 and the sending unit 103 may be implemented by interfaces, and the determining unit 102 may be implemented by a processor.

The receiving unit 101 receives a first request sent by a first security device node, where the first request carries a first flow entry of a first data flow that is currently detected by the first security device node. A flow entry is used to uniquely identify a data flow.

The determining unit 102 extracts the first flow entry in the first request received by the receiving unit 101 and determines first network data flow detection status corresponding to the first flow entry.

The sending unit 103 sends a first response to the first security device node, where the first response carries the first network data flow detection status determined by the determining unit 102, so that the first security device node maintains, according to the first response, second network data flow detection status that corresponds to the first flow entry and is stored on the first security device node.

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

The status synchronizing server 100 may implement each step performed by the status synchronizing server 200 in the preceding method embodiments. To avoid repetition, no further details are provided herein.

Optionally, as an embodiment, the determining unit 102 may query a locally stored registration record of the first flow entry and determine, according to a result of the query, the first network data flow detection status corresponding to the first flow entry, where a registration record of a flow entry includes the flow entry as well as a security device node and network data flow detection status that correspond to the flow entry.

Optionally, as another embodiment, during determining, according to a result of the query, the first network data flow detection status corresponding to the first flow entry, if no registration record of the first flow entry is found, the determining unit 102 may locally add a registration record of the first flow entry, set the network data flow detection status corresponding to the first flow entry in the registration record to NULL, and determine that the first network data flow detection status is NULL; or if the registration record of the first flow entry is found, the determining unit 102 may determine, according to information about a security device node corresponding to the first flow entry in the registration record, the first network data flow detection status corresponding to the first flow entry.

Optionally, as another embodiment, when a security device node corresponding to the first flow entry in the registration record is NULL, the determining unit 102 may determine network data flow detection status corresponding to the first flow entry in the registration record as the first network data flow detection status.

Alternatively, when the security device node corresponding to the first flow entry in the registration record is a second security device node, the determining unit 102 may send a second request to the second security device node, where the second request carries the first flow entry, so as to request the second security device node to send third network data flow detection status that corresponds to the first flow entry and is recorded on the second security device node; when no response to the second request is received from the second security device node, determine the network data flow detection status corresponding to the first flow entry in the registration record as the first network data flow detection status; and when the third network data flow detection status sent by the second security device node is received, update the network data flow detection status that corresponds to the first flow entry and is in the local registration record of the first flow entry to the third network data flow detection status, and determine the third network data flow detection status as the first network data flow detection status.

Optionally, as another embodiment, the first flow entry that is carried in the first request received by the receiving unit 101 may include an identifier of a virtual machine that generates the first data flow and a multi-tuple of the first data flow, as shown in Table 2. In this way, a correspondence may be established between a network flow table and an attribute of a virtual machine. The value of a VM attribute in a flow entry may be NULL. In a case where the value of the VM attribute is NULL, the process in this embodiment of the present invention may be independent of a management platform of the virtual machine. In a case where the value of the VM attribute is not NULL, the process in this embodiment of the present invention may work closely with an operating process of the management platform of the virtual machine, so as to implement a more flexible function and more flexible user experience.

Figure 11:
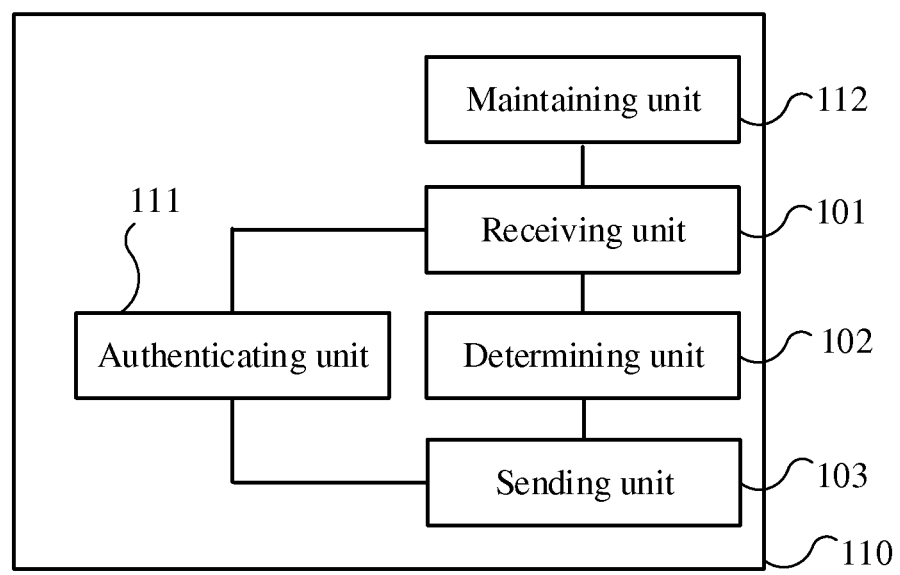
FIG. 11 is a block diagram of a status synchronizing server according to another embodiment of the present invention.

FIG. 11 is a block diagram of a status synchronizing server according to another embodiment of the present invention. In a status synchronizing server 110 in FIG. 11, identical reference signs are used in parts identical to FIG. 10, and duplicate descriptions are properly omitted.

As shown in FIG. 11, except for a receiving unit 101, a determining unit 102, and a sending unit 103, the status synchronizing server 110 may further include an authenticating unit 111. The authenticating unit 111 may be implemented by a processor.

The receiving unit 101 may further receive a connection request sent by a first security device node. The authenticating unit 111 may authenticate an identity of the first security device node according to the connection request received by the receiving unit 101, so as to configure a request permission of the first security device node.

The status synchronizing server 110 may further include a maintaining unit 112. The receiving unit 101 may further receive a status update request that is sent by a third security device node according to a preset triggering event or periodically, where the status update request carries a second flow entry of a second data flow that is currently detected by the third security device node and corresponding network data flow detection status. The maintaining unit 112 may maintain, according to the status update request received by the receiving unit 101, locally stored registration record of flow entries.

Optionally, as an embodiment, the maintaining unit 112 may, when the second flow entry is not locally stored, add a registration record of the second flow entry; when the registration record of the second flow entry is locally stored and a security device node corresponding to the second flow entry in the registration record is the third security device node, update, by using network data flow detection status that corresponds to the second flow entry and is carried in the status update request, network data flow detection status that is locally recorded and corresponds to the second flow entry; and when the registration record of the second flow entry is locally stored and the security device node corresponding to the second flow entry in the registration record is not the third security device node, ignore the status update request.

Optionally, as another embodiment, the status update request received by the receiving unit 101 further carries an event type, where the event type is used to indicate whether the status update request is sent according to the preset triggering event or periodically. In this case, the maintaining unit 112 may further set a security device node corresponding to the second flow entry to NULL in a case where the event type indicates that the status update request is sent according to the preset triggering event; and set the security device node corresponding to the second flow entry to the third security device node in a case where the event type indicates that the status update request is sent periodically.

A security device node is capable of actively triggering an update of network data flow detection status cached on the status synchronizing server 110. In this way, the network data flow detection status cached on the status synchronizing server 110 is maintained as a possibly latest value. Even if the status synchronizing server 110 cannot request the network data flow detection status from the security device node before migration due to a shutdown or a fault of the security device node, it is capable of returning the possibly latest network data flow detection status to the security device node after the migration, thereby improving network security.

Figure 12:
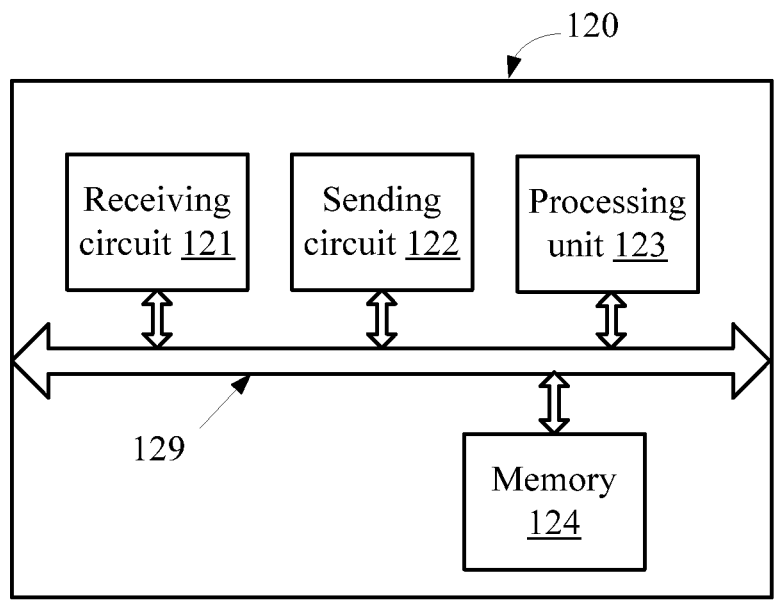
FIG. 12 is a block diagram of a status synchronizing server according to another embodiment of the present invention.

FIG. 12 is a block diagram of a status synchronizing server according to another embodiment of the present invention. A status synchronizing server 120 in FIG. 12 includes a receiving circuit 121, a sending circuit 122, a processor 123, and a memory 124. The receiving circuit 121, the sending circuit 122, the processor 123, and the memory 124 are mutually coupled through a bus system 129.

The receiving unit 121 receives a first request sent by a first security device node, where the first request carries a first flow entry of a first data flow that is currently detected by the first security device node. A flow entry is used to uniquely identify a data flow.

The memory 124 stores an instruction for the processor 123 to determine first network data flow detection status corresponding to the first flow entry.

The sending circuit 122 sends a first response to the first security device node, where the first response carries the first network data flow detection status determined by the processor 123, so that the first security device node maintains, according to the first response, second network data flow detection status that corresponds to the first flow entry and is stored on the first security device node.

Except for a data bus, the bus system 129 may further include a power bus, a control bus, a status signal bus, and the like. However, for clarity purposes, all buses in the figure are marked as the bus system 129.

The memory 124 stores an instruction for the processor 123 to execute each operation and data required for executing the operation. The processor 123 controls an operation of the status synchronizing server 120. The processor 123 may also be called a Central Processing Unit (CPU). The memory 124 may include a read-only memory and a random access memory, and provide an instruction and data for the processor 123. A part of the memory 124 may further include a non-volatile random access memory (NVRAM). The receiving circuit 121 and the sending circuit 122 may execute the method in the embodiments of the present invention under the control of the processor 123.

In an implementation process, each step in the preceding method may be completed by an integrated logical circuit, that is, hardware in the processor 123, or by a command control in a software manner. The processor 123 may be a general processor, a digital signal processor (DSP), an application-specific integrated circuit (ASIC), a field programmable gate array (FPGA) or another programmable logical component, discrete gate or transistor logical component, and discrete hardware component, which is capable of implementing or executing each method, step, and logical block diagram that are disclosed in the embodiments of the present invention. The general processor may be a microprocessor, or the processor may be any common processor and the like. A software module may be located on a mature storage medium in this field, such as a random access memory, a flash memory, a read-only memory, a programmable read-only memory, an electrically erasable programmable memory, or a register. The storage medium is located on the memory 124. The processor 123 reads information stored on the memory 124 and works with its hardware to complete steps in the preceding method. For example, the memory 124 may store a registration record of a flow entry. A registration record of a flow entry includes the flow entry as well as a security device node and network data flow detection status that correspond to the flow entry, as shown in Table 3.

Optionally, as an embodiment, the processor 123 may query a registration record of the first flow entry, where the registration record of the first flow entry is stored on the memory 124, and determines, according to a result of the query, the first network data flow detection status corresponding to the first flow entry.

Optionally, as another embodiment, during determining, according to the result of querying the registration record of the flow entry, the first network data flow detection status corresponding to the first flow entry, if no registration record of the first flow entry is found in the memory 124, the processor 123 may add a registration record of the first flow entry in the memory 124, set network data flow detection status corresponding to the first flow entry in the registration record to NULL, and determine that the first network data flow detection status is NULL. Alternatively, if the registration record of the first flow entry is found in the memory 124, the processor 123 may determine, according to information about a security device node corresponding to the first flow entry in the registration record, the first network data flow detection status corresponding to the first flow entry.

Optionally, as another embodiment, when a security device node corresponding to the first flow entry is NULL, the processor 123 determines network data flow detection status corresponding to the first flow entry as the first network data flow detection status.

Alternatively, the processor 123 may, when the security device node corresponding to the first flow entry is a second security device node, send a second request to the second security device node, where the second request carries the first flow entry, so as to request the second security device node to send third network data flow detection status that corresponds to the first flow entry and is recorded on the second security device node; when no response to the second request is received from the second security device node, determine the network data flow detection status corresponding to the first flow entry in the registration record as the first network data flow detection status; and when the third network data flow detection status sent by the second security device node is received, update the network data flow detection status that corresponds to the first flow entry and is in the local registration record of the first flow entry to the third network data flow detection status, and the registration record of the first flow entry is stored on the memory 124, and determine the third network data flow detection status as the first network data flow detection status.

Optionally, as another embodiment, the first flow entry that is carried in the first request received by the receiving circuit 121 may include an identifier of a virtual machine that generates the first data flow and a multi-tuple of the first data flow, as shown in Table 2. In this way, a correspondence may be established between a network flow table and an attribute of a virtual machine. The value of a VM attribute in a flow entry may be NULL. In a case where the value of the VM attribute is NULL, the process in this embodiment of the present invention may be independent of a management platform of the virtual machine. In a case where the value of the VM attribute is not NULL, the process in this embodiment of the present invention may work closely with an operating process of the management platform of the virtual machine, so as to implement a more flexible function and more flexible user experience.

The receiving circuit 121 may further receive a connection request sent by the first security device node. The processor 123 may authenticate an identity of the first security device node according to the connection request received by the receiving circuit 121, so as to configure a request permission of the first security device node.

The receiving circuit 121 may further receive a status update request that is sent by a third security device node according to a preset triggering event or periodically, where the status update request carries a second flow entry of a second data flow that is currently detected by the third security device node and corresponding network data flow detection status. The processor 123 may maintain, according to the status update request received by the receiving circuit 121, a registration record of a flow entry, where the registration record is stored on the memory 124.

Optionally, as an embodiment, the processor 123 may, when no registration record of the second flow entry is stored on the memory 124, add a registration record of the second flow entry in the memory 124; when the registration record of the second flow entry is stored on the memory 124 and a security device node corresponding to the second flow entry in the registration record is the third security device node, update, by using network data flow detection status that corresponds to the second flow entry and is carried in the status update request, network data flow detection status that corresponds to the second flow entry in the registration record and is stored on the memory 124; and when the registration record of the second flow entry is stored on the memory 124 and the security device node corresponding to the second flow entry in the registration record is not the third security device node, ignore the status update request.

Optionally, as another embodiment, the status update request received by the receiving circuit 121 further carries an event type, where the event type is used to indicate whether the status update request is sent according to the preset triggering event or periodically. In this case, the processor 123 may also set a security device node corresponding to the second flow entry in the registration record to NULL in a case where the event type indicates that the status update request is sent according to the preset triggering event; and, set the security device node corresponding to the second flow entry in the registration record to the third security device node in a case where the event type indicates that the status update request is sent periodically.

A security device node is capable of actively triggering an update of network data flow detection status cached on the status synchronizing server 120. In this way, the network data flow detection status cached on the status synchronizing server 120 is maintained as a possibly latest value. Even if the status synchronizing server 120 cannot request the network data flow detection status from the security device node before migration due to a shutdown or a fault of the security device node, it is capable of returning the possibly latest network data flow detection status to the security device node after the migration, thereby improving network security.

Therefore, the status synchronizing server 100, 110, or 120 is capable of bi-directionally communicating with multiple security device nodes. In addition, the status synchronizing server 100, 110, or 120 is capable of receiving a request for querying/registering a flow entry, where the request is submitted by the security device node, returning a response value to the security device node, and storing related information, as described in the embodiments of FIG. 5 and FIG. 6.

The status synchronizing server 100, 110, or 120 is capable of sending a request for querying network data flow detection status to a security device node corresponding to a certain flow entry, obtaining an existing detection status value, and forwarding the value to the queried security device node, as described in the embodiments of FIG. 7 and FIG. 8.

When a request that is for updating the value of network data flow detection status and is actively sent by a certain security device node is received, the status synchronizing server 100, 110, or 120 is capable of caching the status value into a status cache field corresponding to the flow entry for future use, as described in the embodiment of FIG. 9.

This embodiment of the present invention does not set a limitation to a specific implementation manner of the status synchronizing servers 100, 110, and 120. For example, it may be an independently disposed server, and it may be located on a general server or another network device, for example, it may be located on a certain host.

Figure 13:
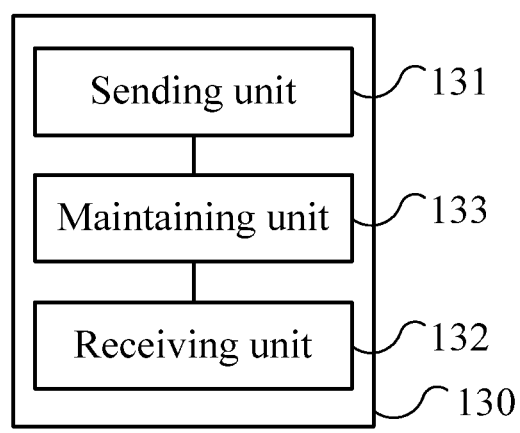
FIG. 13 is a block diagram of a security device node according to an embodiment of the present invention.

FIG. 13 is a block diagram of a security device node according to an embodiment of the present invention. An example of a security device node 130 in FIG. 13 is security device node SIF/IDS1 and SIF/IDS2 that are shown in FIG. 2, including a sending unit 131, a receiving unit 132, and a maintaining unit 133. The sending unit 131 and the receiving unit 132 may be implemented by interfaces, and the maintaining unit 133 may be implemented by a processor.

The sending unit 131 sends a first request to a status synchronizing server, where the first request carries a first flow entry of a first data flow that is currently detected by the security device node 130. A flow entry is used to uniquely identify a data flow.

The receiving unit 132 receives a first response that is sent by the status synchronizing server according to the first request, where the first response carries first network data flow detection status corresponding to the first flow entry.

The maintaining unit 133 maintains, according to the first response, second network data flow detection status that corresponds to the first flow entry and is stored on the security device node 130.

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

The security device node 130 may implement each step performed by security device nodes SIF/IDS1 and SIF/IDS2 in the preceding method embodiments. To avoid repetition, no further details are provided herein.

Optionally, as an embodiment, the first flow entry that is carried in the first request sent by the sending unit 131 may include an identifier of a virtual machine that generates the first data flow and a multi-tuple of the first data flow, as shown in Table 2. In this way, a correspondence may be established between a network flow table and an attribute of a virtual machine. The value of a VM attribute in a flow entry may be NULL. In a case where the value of the VM attribute is NULL, the process in this embodiment of the present invention may be independent of a management platform of the virtual machine. In a case where the value of the VM attribute is not NULL, the process in this embodiment of the present invention may work closely with an operating process of the management platform of the virtual machine, so as to implement a more flexible function and more flexible user experience.

Figure 14:
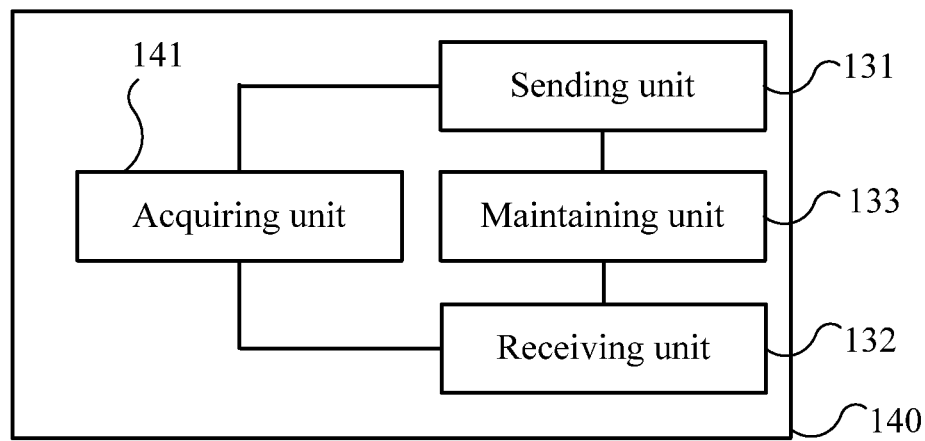
FIG. 14 is a block diagram of a security device node according to another embodiment of the present invention.

FIG. 14 is a block diagram of a security device node according to another embodiment of the present invention. In a security device node 140 in FIG. 14, identical reference signs are used in parts identical to FIG. 13, and duplicate descriptions are properly omitted.

As shown in FIG. 14, except for a sending unit 131, a receiving unit 132, and a maintaining unit 133, the security device node 140 may further include an acquiring unit 141. The acquiring unit 141 may be implemented by a processor.

The receiving unit 132 may further receive a second request sent by a status synchronizing server, where the second request carries a third flow entry of a third data flow that is currently detected by another security device node.

The acquiring unit 141 may acquire third network data flow detection status that corresponds to the third flow entry and is recorded on the security device node 140.

The sending unit 131 may further send a second response to the status synchronizing server, where the second response carries the third network data flow detection status.

In this way, the security device node 140 may return, according to the request of the status synchronizing server, locally stored network data flow detection status.

Optionally, as another embodiment, the sending unit 131 may further send a connection request to the status synchronizing server, so that the status synchronizing server authenticates an identity of the security device node 140 according to the connection request. The receiving unit 132 may further receive information about a request permission of the security device node 140, where the information about the request permission is configured by the status synchronizing server after the identity authentication succeeds.

Optionally, as another embodiment, the sending unit 131 may further send a status update request to the status synchronizing server according to a preset triggering event or periodically, where the status update request carries a second flow entry of a second data flow that is currently detected by the security device node 140 and corresponding network data flow detection status, so that the status synchronizing server maintains, according to the status update request, a registration record of the flow entry, where the registration record of the flow entry is stored on the status synchronizing server.

Optionally, as another embodiment, the status update request sent by the sending unit 131 further carries an event type, where the event type is used to indicate whether the status update request is sent according to the preset triggering event or periodically.

The security device node 140 is capable of actively triggering an update of network data flow detection status cached on the status synchronizing server. In this way, the network data flow detection status cached on the status synchronizing server is maintained as a possibly latest value. Even if the status synchronizing server cannot request the network data flow detection status from the security device node before migration due to a shutdown or a fault of the security device node, it is capable of returning the possibly latest network data flow detection status to the security device node after the migration, thereby improving network security.

Figure 15:
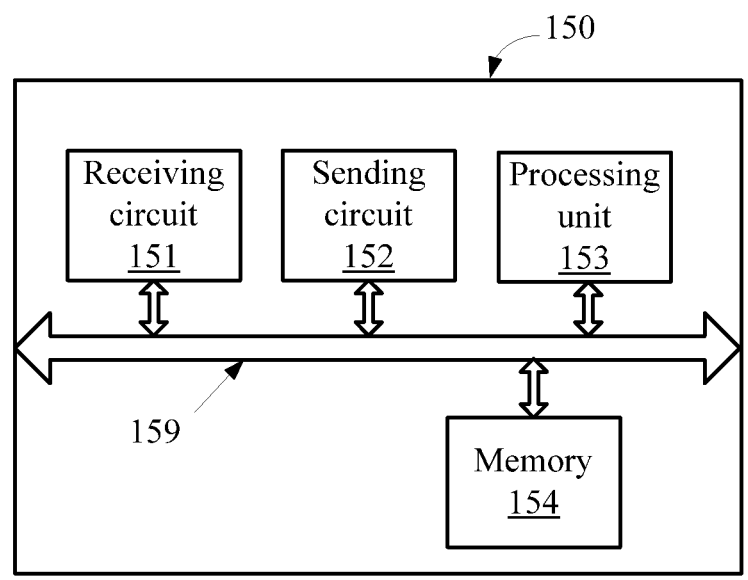
FIG. 15 is a block diagram of a security device node according to another embodiment of the present invention.

FIG. 15 is a block diagram of a security device node 150 according to another embodiment of the present invention. The security device node 150 in FIG. 15 includes a receiving circuit 151, a sending circuit 152, a processor 153, and a memory 154. The receiving circuit 151, the sending circuit 152, the processor 153, and the memory 154 are mutually coupled through a bus system 159.

The sending circuit 152 sends a first request to a status synchronizing server, where the first request carries a first flow entry of a first data flow that is currently detected by the security device node 150. A flow entry is used to uniquely identify a data flow.

The receiving circuit 151 receives a first response that is sent by the status synchronizing server according to the first request, where the first response carries first network data flow detection status corresponding to the first flow entry.

The memory 154 stores an instruction for the processor 153 to maintain, according to the first response, second network data flow detection status that corresponds to the first flow entry and is stored on the security device node 150.

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

Except for a data bus, the bus system 159 may further include a power bus, a control bus, a status signal bus, and the like. However, for clarity purposes, all buses in the figure are marked as the bus system 159.

The memory 154 stores an instruction for the processor 153 to execute each operation and data required for executing the operation. The processor 153 controls an operation of the security device node 150. The processor 153 may also be called a CPU. The memory 154 may include a read-only memory and a random access memory, and provide an instruction and data for the processor 153. A part of the memory 154 may further include an NVRAM. The receiving circuit 151 and the sending circuit 152 may execute the method in the embodiments of the present invention under the control of the processor 153.

In an implementation process, each step in the preceding method may be completed by an integrated logical circuit, that is, hardware in the processor 153, or by a command control in a software manner. The processor 153 may be a general processor, a DSP, an ASIC, an FPGA or another programmable logical component, discrete gate or transistor logical component, and discrete hardware component, which is capable of implementing or executing each method, step, and logical block diagram that are disclosed in the embodiments of the present invention. The general processor may be a micro-processor, or the processor may be any common processor and the like. A software module may be located on a mature storage medium in this field, such as a random access memory, a flash memory, a read-only memory, a programmable read-only memory, an electrically erasable programmable memory, or a register. The storage medium is located on the memory 154. The processor 153 reads information stored on the memory 154 and works with its hardware to complete steps in the preceding method. For example, the memory 154 may store various data structures of flow entries, as shown in FIG. 6 and FIG. 7.

Optionally, as another embodiment, the first flow entry that is carried in the first request sent by the sending circuit 152 may include an identifier of a virtual machine that generates the first data flow and a multi-tuple of the first data flow, as shown in Table 2. In this way, a correspondence may be established between a network flow table and an attribute of a virtual machine. The value of a VM attribute in a flow entry may be NULL. In a case where the value of the VM attribute is NULL, the process in this embodiment of the present invention may be independent of a management platform of the virtual machine. In a case where the value of the VM attribute is not NULL, the process in this embodiment of the present invention may work closely with an operating process of the management platform of the virtual machine, so as to implement a more flexible function and more flexible user experience.

Optionally, as another embodiment, the receiving unit 151 may further receive a second request sent by the status synchronizing server, where the second request carries a third flow entry of a third data flow that is currently detected by another security device node. The processor 153 may acquire third network data flow detection status that corresponds to the third flow entry and is in a registration record stored on the memory 154. The sending circuit 152 may further send a second response to the status synchronizing server, where the second response carries the third network data flow detection status.

In this way, the security device node 150 may return, according to the request of the status synchronizing server, locally stored network data flow detection status.

Optionally, as another embodiment, the sending circuit 152 may further send a connection request to the status synchronizing server, so that the status synchronizing server authenticates an identity of the security device node 150 according to the connection request. The receiving circuit 151 may further receive information about a request permission of the security device node 150, where the information about the request permission is configured by the status synchronizing server after the identity authentication succeeds.

Optionally, as another embodiment, the sending circuit 152 may further send a status update request to the status synchronizing server according to a preset triggering event or periodically, where the status update request carries a second flow entry of a second data flow that is currently detected by the security device node 150 and corresponding network data flow detection status, so that the status synchronizing server maintains, according to the status update request, a registration record of the flow entry, where the registration record of the flow entry is stored on the status synchronizing server.

Optionally, as another embodiment, the status update request sent by the sending circuit 152 further carries an event type, where the event type is used to indicate whether the status update request is sent according to the preset triggering event or periodically.

The security device node 150 is capable of actively triggering an update of network data flow detection status cached on the status synchronizing server. In this way, the network data flow detection status cached on the status synchronizing server is maintained as a possibly latest value. Even if the status synchronizing server cannot request the network data flow detection status from the security device node before migration due to a shutdown or a fault of the security device node, it is capable of returning the possibly latest network data flow detection status to the security device node after the migration, thereby improving network security.

Therefore, the security device node 130, 140, or 150 is capable of performing registration with the status synchronizing server, as shown in the embodiment of FIG. 9, and implementing bi-directional communication. In addition, the security device node 130, 140, or 150 is capable of storing and maintaining a flow entry.

The security device node 130, 140, or 150 is capable of submitting a request for querying/registering a flow entry to the status synchronizing server, as described in the embodiments of FIG. 5 and FIG. 6.

The security device node 130, 140, or 150 is capable of sending, according to the request of the status synchronizing server or in an active manner, a value of network data flow detection status to the status synchronizing server, as described in the embodiments of FIG. 7-FIG. 9.

The security device node 130, 140, or 150 may be disposed on a host device (for example, HOST1 or HOST2 shown in FIG. 2).

Figure 16:
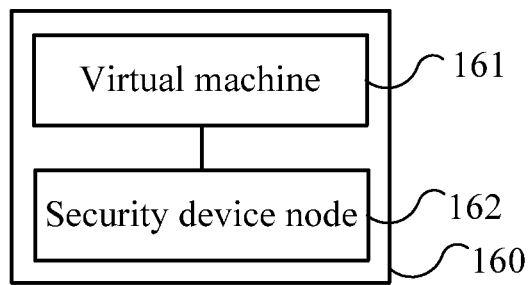
FIG. 16 is a block diagram of a host device according to an embodiment of the present invention.

FIG. 16 is a block diagram of a host device according to an embodiment of the present invention. An example of a host device 160 in FIG. 16 is HOST1 or HOST2 shown in FIG. 2, including one or more virtual machines 161 and a security device node 162.

An example of a virtual machine 161 is E1 shown in FIG. 2, FIG. 5, and FIG. 6. For brevity, FIG. 16 depicts only one virtual machine 161. However, this embodiment of the present invention does not set a limitation to the number of virtual machines on the host device 160. The virtual machine 161 may be a well-known virtual machine in this field, is capable of performing data communication, and is capable of migrating among different hosts.

A security device node 162 is configured to perform security detection for data flows of the one or more virtual machines 161. For example, the security device node 162 may be implemented as a security device node IDS/SIF in the embodiments of FIG. 2-FIG. 9, or be implemented as the security device node 130, 140, or 150 in FIG. 13-FIG. 15. Therefore, for brevity, no specific functions of the security device node 162 are described herein again.

According to this embodiment of the present invention, a security device node requests previous network data flow detection status of a data flow from a status synchronizing server so as to synchronize network data flow detection status, thereby allowing the security device node to detect a network attack in a more accurate way and improving network system security.

Figure 17:
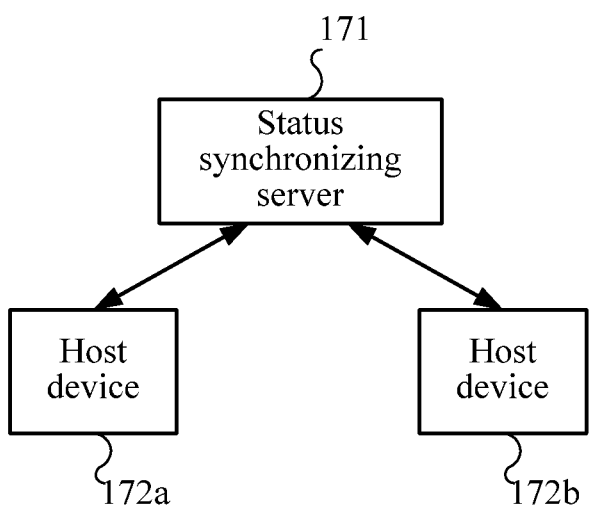
FIG. 17 is a block diagram of a network system according to an embodiment of the present invention.

FIG. 17 is a block diagram of a network system according to an embodiment of the present invention. A network system in FIG. 17 includes a status synchronizing server 171 and at least one host device 172.

The status synchronizing server 171 may be implemented as the status synchronizing server 200 in the embodiments of FIG. 2-FIG. 9 or may be implemented as the status synchronizing server 100, 110, or 120 in FIG. 10-FIG. 12. Therefore, for brevity, no specific functions of the status synchronizing server 171 are described herein again.

For brevity, FIG. 17 depicts two host devices 172*a* and 172*b* (which may be uniformly called a host device 172). However, this embodiment of the present invention does not set a limitation to the number of host devices 172. A data connection is established between a security device node on the host device 172 and the status synchronizing server 171, so as to exchange network data flow detection status corresponding to a data flow that is detected by the security device node.

Optionally, as an embodiment, a first virtual machine on the host device 172*a* migrates to the host device 172*b*. In this case, a security device node on the host device 172*b* acquires, from the status synchronizing server 171, network data flow detection status before the first virtual machine migrates. In this way, this embodiment of the present invention provides a mechanism for synchronizing, before and after a virtual machine migrates, information about existing security detection status of network traffic of the virtual machine between multiple security device nodes that detect the network traffic of the virtual machine. In this way, even under a condition where the virtual machine migrates, a different security device node is still capable of properly completing a function of "stateful" network traffic detection for the network traffic of the virtual machine.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separated, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present invention. The foregoing storage medium includes: any medium that can store program code, such as a universal serial bus (USB) flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method implemented by a status synchronizing server for synchronizing network data flow detection status, wherein the status synchronization server is communicatively coupled to at least two security device nodes, the method comprising:

receiving a first request sent by a first security device node, wherein the first request carries a first flow entry, wherein the first flow entry uniquely identifies a first data flow that is currently detected by the first security device node;

determining first network data flow detection status corresponding to the first flow entry, wherein the first network data flow detection status comprises a first sequence of network events that have previously occurred in the first data flow and that are detected by another security device node, and wherein the other security device node is different than the first security device node; and sending a first response to the first security device node, wherein the first response carries the first network data flow detection status, wherein the first network data flow detection status carried in the first response is used by the first security device node to generate second network data flow detection status stored locally, wherein the second network data flow detection status comprises a second sequence of network events, wherein the second sequence of network events is generated by connecting the first sequence of network events with a third sequence of network events that occurred in the first data flow and detected by the first security device node, and wherein the second sequence of network events is used by the first security device to determine whether an attack occurs.

2. The method according to claim 1, wherein determining the first network data flow detection status corresponding to the first flow entry comprises:

querying at least one locally stored registration record for a registration record that comprises the first flow entry, wherein each one of the at least one locally stored registration record comprises a flow entry as well as a security device node and network data flow detection status that correspond to the flow entry; and determining, according to a result of the query, the first network data flow detection status corresponding to the first flow entry.

3. The method according to claim 2, wherein no registration record that comprises the first flow entry is found, and wherein determining, according to the result of the query, the first network data flow detection status corresponding to the first flow entry comprises locally adding a registration record that comprises the first flow entry, setting network data flow detection status in the added registration record to NULL, and determining that the first network data flow detection status is NULL.

4. The method according to claim 2, wherein the registration record that comprises the first flow entry is found, and wherein determining, according to the result of the query, the first network data flow detection status corresponding to the first flow entry comprises determining, according to information about a security device node corresponding to the first flow entry in the found registration record, the first network data flow detection status corresponding to the first flow entry.

5. The method according to claim 4, wherein determining, according to the information about the security device node corresponding to the first flow entry in the found registration record, the first network data flow detection status corresponding to the first flow entry comprises determining network data flow detection status corresponding to the first flow entry in the found registration record as the first network data flow detection status when the security device node corresponding to the first flow entry in the found registration record is NULL.

6. The method according to claim 4, wherein determining, according to the information about the security device node corresponding to the first flow entry in the registration record, the first network data flow detection status corresponding to the first flow entry comprises:
sending a second request to a second security device node when the security device node corresponding to the first flow entry in the found registration record is the second security device node, wherein the second request carries the first flow entry to request the second security device node to send third network data flow detection status, wherein the third network data flow detection status is a sequence of network events that have occurred in the first data flow and that are detected by the second security device node;
determining the network data flow detection status corresponding to the first flow entry in the found registration record as the first network data flow detection status when no response to the second request is received from the second security device node; and
updating the network data flow detection status that corresponds to the first flow entry and is in the local found registration record to the third network data flow detection status, and determining the third network data flow detection status as the first network data flow detection status when the third network data flow detection status sent by the second security device node is received.

7. The method according to claim 1, wherein before receiving the first request sent by the first security device node, the method further comprises:
receiving a connection request sent by the first security device node; and
authenticating an identity of the first security device node according to the connection request to configure a request permission of the first security device node.

8. The method according to claim 1, further comprising:
receiving a status update request that is sent by a third security device node according to a preset triggering event or periodically, wherein the status update request carries a second flow entry and network data flow detection status corresponding to the second flow entry, wherein the second flow entry uniquely identifies a second data flow that is currently detected by the third security device node; and
maintaining, according to the status update request, locally stored registration record of flow entries.

9. The method according to claim 8, wherein maintaining, according to the status update request, the locally stored registration record of flow entries comprises:
adding a registration record that comprises the second flow entry when no registration record that comprises the second flow entry is locally stored, wherein network data flow detection status in the added registration record is recorded as the network data flow detection status carried in the status update request, and wherein security device node in the added registration record is recorded as the third security device node or NULL;
updating, by using network data flow detection status carried in the status update request, network data flow detection status that is in a locally stored registration record that comprises the second flow entry when the registration record that comprises the second flow entry is locally stored and a security device node in the locally stored registration record is the third security device node; and
ignoring the status update request when the registration record that comprises the second flow entry is locally stored and the security device node in the locally stored registration record is not the third security device node.

10. The method according to claim 9, wherein the status update request further carries an event type, wherein the event type is used to indicate whether the status update request is sent according to a preset triggering event or periodically, and wherein maintaining, according to the status update request, the locally stored registration record of flow entries further comprises:
setting the security device node corresponding to the second flow entry in the registration record that comprises the second flow entry to NULL when the event type indicates that the status update request is sent according to the preset triggering event; and
setting the security device node corresponding to the second flow entry in the registration record that comprises the second flow entry to the third security device node when the event type indicates that the status update request is sent periodically.

11. A method implemented by a first security device node for synchronizing network data flow detection status, comprising:
sending a first request to a status synchronizing server, wherein the first request carries a first flow entry, wherein the first flow entry uniquely identifies a first data flow that is currently detected by the first security device node;
receiving a first response that is sent by the status synchronizing server according to the first request, wherein the first response carries first network data flow detection status corresponding to the first flow entry, wherein the first network data flow detection status comprises a first sequence of network events that have previously occurred in the first data flow and that are detected by another security device node, and wherein the other security device node is different than the first security device node; and
generating second network data flow detection status stored locally, wherein the second network data flow detection status comprises a second sequence of network events, wherein the second sequence of network events is generated by connecting the first sequence of network events with a third sequence of network events that occurred in the first data flow and detected by the first security device node; and
determining that an attack occurs in the first data flow when the the second sequence of network events matches with a detection rule.

12. The method according to claim 11, further comprising:
receiving a second request sent by the status synchronizing server, wherein the second request carries a third flow entry, wherein the third flow entry uniquely identifies a third data flow that is currently detected by a forth security device node;
acquiring third network data flow detection status that corresponds to the third flow entry and is recorded on the first security device node, wherein the third network data flow detection status comprises a sequence of network events that have previously occurred in the third data flow and are detected by the first security device node; and sending a second response to the status synchronizing server, wherein the second response carries the third network data flow detection status.

13. The method according to claim 11, wherein before sending the first request to the status synchronizing server, the method further comprises:
sending a connection request to the status synchronizing server such that the status synchronizing server authenticates an identity of the first security device node according to the connection request; and
receiving information about a request permission of the first security device node, wherein the request permission is configured by the status synchronizing server after the identity authentication succeeds.

14. The method according to claim 11, further comprising sending a status update request to the status synchronizing server according to a preset triggering event or periodically, wherein the status update request carries a second flow entry and network data flow detection status corresponding to the second flow entry, wherein the second flow entry uniquely identifies the second data flow that is currently detected by the first security device node, wherein the network data flow detection status corresponding to the second flow entry comprises a sequence of network events that have previously occurred in the second data flow and are detected by the first security device node, and wherein the status update request is used by the status synchronizing server to maintain a registration record stored on the status synchronizing server.

15. The method according to claim 14, wherein the status update request further carries an event type, and wherein the event type is used to indicate the status update request is sent according to a preset triggering event or periodically.

16. A status synchronizing server, comprising:
a receiving circuit;
a sending circuit;
a processor; and
a memory,
wherein the receiving circuit is configured to receive a first request sent by a first security device node,
wherein the first request carries a first flow entry,
wherein the first flow entry uniquely identifies a first data flow that is currently detected by the first security device node,
wherein the memory stores an instruction for the processor to determine first network data flow detection status corresponding to the first flow entry,
wherein the first network data flow detection status comprises a first sequence of network events that have previously occurred in the first data flow and are detected by another security device node,
wherein the other security device node is different than the first security device node,
wherein the sending circuit is configured to send a first response to the first security device node,
wherein the first response carries the first network data flow detection status determined by the processor,
wherein the first network data flow detection status carried in the first response is used by the first security device node to generate second network data flow detection status stored locally,
wherein the second network data flow detection status comprises a second sequence of network events,
wherein the second sequence of network events is generated by connecting the first sequence of network events with a third sequence of network events that occurred in the first data flow and detected by the first security device node, and
wherein the second sequence of network events is used by the first security device to determine whether an attack occurs.

17. A security device node, comprising:
a receiving circuit;
a sending circuit;
a processor, and
a memory,
wherein the sending circuit is configured to send a first request to a status synchronizing server,
wherein the first request carries a first flow entry,
wherein the first flow entry uniquely identifies a first data flow that is currently detected by the first security node,
wherein the receiving circuit is configured to receive a first response that is sent by the status synchronizing server according to the first request,
wherein the first response carries first network data flow detection status corresponding to the first flow entry,
wherein the first network data flow detection status comprises a first sequence of network events that have previously occurred in the first data flow and are detected by another security device node,
wherein the other security device node is different than the first security device node, and
wherein the memory is configured to store an instruction for the processor to:
generate second network data flow detection status stored locally, wherein the second network data flow detection status comprises a second sequence of network events, wherein the second sequence of network events is generated by connecting the first sequence of network events with a third sequence of network events that occurred in the first data flow and detected by the first security device node; and
determine an attack occurs in the first data flow when the second sequence of network events matches with a detection rule.

18. A network system, comprising:
a status synchronizing server configured to:
receive a first request sent by a first security device node, wherein the first request carries a first flow entry, wherein the first flow entry uniquely identifies a first data flow that is currently detected by the first security device node;
determine first network data flow detection status corresponding to the first flow entry, wherein the first network data flow detection status comprises a first sequence of network events that have previously occurred in the first data flow and are detected by another security device node, and wherein the other security device node is different than the first security device node;
send a first response to the first security device node, wherein the first response carries the first network data flow detection status determined; and
at least one host device, a host device of the at least one host device comprises one or more virtual machines and the first security device node, wherein the host device is configured to:
send the first request to a status synchronizing server;
receive the first response that is sent by the status synchronizing server according to the first request;
generate second network data flow detection status stored locally, wherein the second network data flow detection status comprises a second sequence of network events, wherein the second sequence of network events is generated by connecting the first sequence of network events with a third sequence of network events that occurred in the first data flow and detected by the first security device node; and determine an attack occurs in the first data flow when the second sequence of network events matches with a detection rule, and wherein a data connection is established between the first security device node and the status synchronizing server to exchange network data flow detection status.

19. The network system according to claim 18, wherein the at least one host device comprises a first host device and a second host device, wherein a first virtual machine on the first host device migrates to the second host device, and wherein a security device node on the second host device acquires, from the status synchronizing server, network data flow detection status of a data flow generated by the first virtual machine before the migration of the first virtual machine.

\* \* \* \* \*